United States Patent
Yu

(10) Patent No.: US 11,654,914 B2
(45) Date of Patent: May 23, 2023

(54) VEHICLE CONTROL DEVICE, VEHICLE CONTROL METHOD, AND STORAGE MEDIUM

(71) Applicant: HONDA MOTOR CO., LTD., Tokyo (JP)

(72) Inventor: Kaijiang Yu, Wako (JP)

(73) Assignee: HONDA MOTOR CO., LTD., Tokyo (JP)

(*) Notice: Subject to any disclaimer, the term of this patent is extended or adjusted under 35 U.S.C. 154(b) by 191 days.

(21) Appl. No.: 17/160,441

(22) Filed: Jan. 28, 2021

(65) Prior Publication Data

US 2021/0237738 A1  Aug. 5, 2021

(30) Foreign Application Priority Data

Feb. 5, 2020  (JP) .............................. JP2020-017786

(51) Int. Cl.
*B60W 30/18*  (2012.01)
*B60W 30/095*  (2012.01)
(Continued)

(52) U.S. Cl.
CPC .. *B60W 30/18163* (2013.01); *B60W 30/0953* (2013.01); *B60W 40/04* (2013.01);
(Continued)

(58) Field of Classification Search
CPC ....... B60W 30/18163; B60W 30/0953; B60W 40/04; B60W 60/0011; B60W 2552/10;
(Continued)

(56) References Cited

U.S. PATENT DOCUMENTS

2017/0369055 A1* 12/2017 Saigusa .................. G08G 1/161
2018/0319403 A1* 11/2018 Buburuzan ............ G06V 20/56

FOREIGN PATENT DOCUMENTS

JP     2009-230377         10/2009
WO     2017/163614         9/2017
WO     WO-2017163614 A1 *  9/2017  ............. B60R 21/00

OTHER PUBLICATIONS

Tanaka H, Nov. 22, 2018, English Machine Translation_JPWO2017163614A1 provided by Patent Translate by EPO and Google (Year: 2018).*

(Continued)

*Primary Examiner* — Peter D Nolan
*Assistant Examiner* — Ashley L Redhead, Jr.
(74) *Attorney, Agent, or Firm* — Amin, Turocy & Watson, LLP

(57) ABSTRACT

A vehicle control device includes a merging controller configured to generate a first plan for changing a lane of the self-vehicle to in front of or behind a first vehicle, based on a relative relationship between a position and a speed of the self-vehicle and the first vehicle, and allow the self-vehicle to change lanes to the first main lane based on the first plan when it is estimated that a third vehicle is able to change lanes to a second main lane adjacent to the first main lane without interfering with a fourth vehicle, based on a relative relationship between a position and a speed of the first vehicle or a second vehicle present behind the self-vehicle and traveling and the fourth vehicle in a case where it is assumed that the self-vehicle has changed lanes to the first main lane based on the first plan.

7 Claims, 18 Drawing Sheets

(51) Int. Cl.
*B60W 40/04* (2006.01)
*B60W 60/00* (2020.01)

(52) U.S. Cl.
CPC ..... *B60W 60/0011* (2020.02); *B60W 2552/10* (2020.02); *B60W 2554/4041* (2020.02); *B60W 2554/4049* (2020.02)

(58) Field of Classification Search
CPC . B60W 2554/4041; B60W 2554/4049; B60W 10/20; B60W 30/08; B60W 10/04; B60W 2420/42; B60W 2420/52; B60W 2520/10; B60W 2520/105; B60W 2520/14; B60W 2520/18; B60W 2556/10; B60W 2556/50; B60W 2556/65; G08G 1/166
See application file for complete search history.

(56) References Cited

OTHER PUBLICATIONS

Japanese Office Action for Japanese Patent Application No. 2020-017786 dated Aug. 24, 2021.

* cited by examiner

VEHICLE CONTROL DEVICE, VEHICLE CONTROL METHOD, AND STORAGE MEDIUM

CROSS-REFERENCE TO RELATED APPLICATION

Priority is claimed on Japanese Patent Application No. 2020-017786, filed Feb. 5, 2020, the content of which is incorporated herein by reference.

BACKGROUND

Field of the Invention

The present invention relates to a vehicle control device, a vehicle control method, and a storage medium.

Description of Related Art

In the related art, a driving support device for vehicle, which allows a self-vehicle to merge into the flow of vehicles on a merging destination lane, has been disclosed (for example, see Patent Document 1). The driving support device for vehicle calculates a merging time difference between the arrival time of the self-vehicle at a merging position on the merging destination lane and the arrival time at merging candidate spaces for merging positions between vehicles on the merging destination lane, and allows a display device to display a bird's-eye view of near the merging position including display of merging candidate spaces visually prioritized in ascending order of merging time difference and display of the self-vehicle when a merging candidate space, whose merging time difference is less than a predetermined first reference time, is detected (Japanese Unexamined Patent Application, First Publication No. 2009-230377).

However, there is a case where the above device may not be able to perform appropriate merging according to traffic conditions.

SUMMARY

The present invention is achieved in view of the problems described above, and one object of the present invention is to provide a vehicle control device, a vehicle control method, and a storage medium, by which it is possible to perform more appropriate merging according to traffic conditions.

A vehicle control device, a vehicle control method, and a storage medium according to the invention employ the following configurations.

(1) A vehicle control device is a vehicle control device including a recognizer configured to recognize a position and a speed of a vehicle traveling in a lane included in a main lane, the main lane being a merging destination of a merging path, when a self-vehicle is traveling in the merging path; and a merging controller configured to generate a first plan for changing a lane of the self-vehicle to in front of or behind a first vehicle traveling in a first main lane closest to the merging path of the main lane, based on a relative relationship between a position and a speed of the self-vehicle and a position and a speed of the first vehicle, and to allow the self-vehicle to change lanes to the first main lane based on the first plan when it is estimated that a third vehicle is able to change lanes to a second main lane adjacent to the first main lane without interfering with a fourth vehicle, based on a relative relationship between a position and a speed of the third vehicle and a position and a speed of the fourth vehicle in a case where it is assumed that the self-vehicle has changed lanes to the first main lane based on the first plan, the third vehicle being the first vehicle or a second vehicle present behind the self-vehicle and traveling in the first main lane, the fourth vehicle traveling in the vicinity of the third vehicle in the second main lane.

(2) In the aspect (1), when it is estimated that the third vehicle interferes with the fourth vehicle when changing the lane to the second main lane, the merging controller is configured to allow the self-vehicle to change lanes to the first main lane based on a second plan different from the first plan.

(3) In the aspect (1) or (2), the merging controller is configured to generate the first plan for changing the lane of the self-vehicle to in front of or behind the first vehicle in the first main lane based on the relative relationship between the position and the speed of the self-vehicle and the position and the speed of the first vehicle and determination information associated with a criterion that two vehicles will interfere with each other based on a relative relationship between the two vehicles, and is configured to determine whether the third vehicle is able to change lanes to the second main lane without interfering with the fourth vehicle, based on the relative relationship between the position and the speed of the third vehicle and the position and the speed of the fourth vehicle, and the determination information.

(4) In any one of the aspects (1) to (3), in a case where it is estimated that the third vehicle is able to change lanes to the second main lane without interfering with the fourth vehicle, when it is estimated that the fourth vehicle is able to change lanes to a third main lane without interfering with a fifth vehicle based on a relative relationship between the position and the speed of the fourth vehicle and a position and a speed of the fifth vehicle, the merging controller is configured to allow the self-vehicle to change lanes to the first main lane based on the first plan, the fifth vehicle traveling around the fourth vehicle in the third main lane adjacent to the second main lane.

(5) In the aspect (4), when it is estimated that the fourth vehicle interferes with the fifth vehicle when changing the lane to the third main lane, the merging controller is configured to allow the self-vehicle to change lanes to the first main lane based on a second plan different from the first plan.

(6) In the aspect (4) or (5), based on a relative relationship between a pair of two vehicles and determination information associated with a criterion that the two vehicles will interfere with each other, the merging controller is configured to determine whether the self-vehicle is able to change lanes to the first main lane, the third vehicle is able to change lanes to the second main lane, and the fourth vehicle is able to change lanes to the third main lane.

(7) A vehicle control method according to an aspect of the invention is a vehicle control method implemented by a computer performing: a process of recognizing a position and a speed of a vehicle traveling in a lane included in a main lane, the main lane being a merging destination of a merging path, when a self-vehicle is traveling in the merging path; and a process of generating a first plan for changing a lane of the self-vehicle to in front of or behind a first vehicle traveling in a first main lane closest to the merging path of the main lane, based on a relative relationship between a position and a speed of the self-vehicle and a position and a speed of the first vehicle; and a process of allowing the self-vehicle to change lanes to the first main lane based on the first plan when it is estimated that a third vehicle is able to change lanes to a second main lane adjacent to the first main lane without interfering with a fourth vehicle, based on a relative relationship between a position and a speed of the third vehicle and a position and a speed of the fourth vehicle in a case where it is assumed that the self-vehicle has changed lanes to the first main lane based on the first plan, the third vehicle being the first vehicle or a second vehicle present behind the self-vehicle and traveling in the first main lane, the fourth vehicle traveling in the vicinity of the third vehicle in the second main lane.

(8) A program stored in a storage medium according to an aspect of the invention and causing a computer to perform: a process of recognizing a position and a speed of a vehicle traveling in a lane included in a main lane, which is a merging destination of a merging path, when a self-vehicle is traveling in the merging path; and a process of generating a first plan for changing a lane of the self-vehicle to in front of or behind a first vehicle, which travels in a first main lane closest to the merging path of the main lane, based on a relative relationship between a position and a speed of the self-vehicle and a position and a speed of the first vehicle; and a process of allowing the self-vehicle to change lanes to the first main lane based on the first plan when it is estimated that a third vehicle is able to change lanes to a second main lane adjacent to the first main lane without interfering with a fourth vehicle, based on a relative relationship between a position and a speed of the third vehicle and a position and a speed of the fourth vehicle in a case where it is assumed that the self-vehicle has changed lanes to the first main lane based on the first plan, the third vehicle being the first vehicle or a second vehicle present behind the self-vehicle and traveling in the first main lane, the fourth vehicle traveling in the vicinity of the third vehicle in the second main lane.

According to (1) to (9), when it is estimated that the third vehicle is able to change lanes to the second main lane without interfering with the fourth vehicle, the vehicle control device is configured to allow the self-vehicle to perform a lane change based on the first plan for changing the lane of the self-vehicle to in front of or behind the first vehicle, so that it is possible to perform more appropriate merging according to traffic conditions.

According to (3), since determination information used for generating the first plan is the same as determination information for estimating whether the third vehicle is able to change lanes to the second main lane without interfering with the fourth vehicle, the vehicle control device can easily generate the first plan and estimate whether the third vehicle is able to change lanes to the second main lane without interfering with the fourth vehicle.

According to (4) or (5), when it is estimated that the fourth vehicle is able to change lanes to the third main lane without interfering with the fifth vehicle, the vehicle control device is configured to allow the self-vehicle to change lanes to the first main lane based on the first plan, so that it is possible to perform more appropriate merging according to surrounding traffic conditions.

According to (6), the self-vehicle changes the lane by using the determination information associated with the criterion that two vehicles will interfere with each other, so that the vehicle control device can easily determine whether surrounding vehicles interfere with other vehicles.

DESCRIPTION OF EMBODIMENTS

Hereinafter, an embodiment of a vehicle control device, a vehicle control method, and a storage medium of the present invention will be described with reference to the drawings.

Overall Configuration

Figure 1:
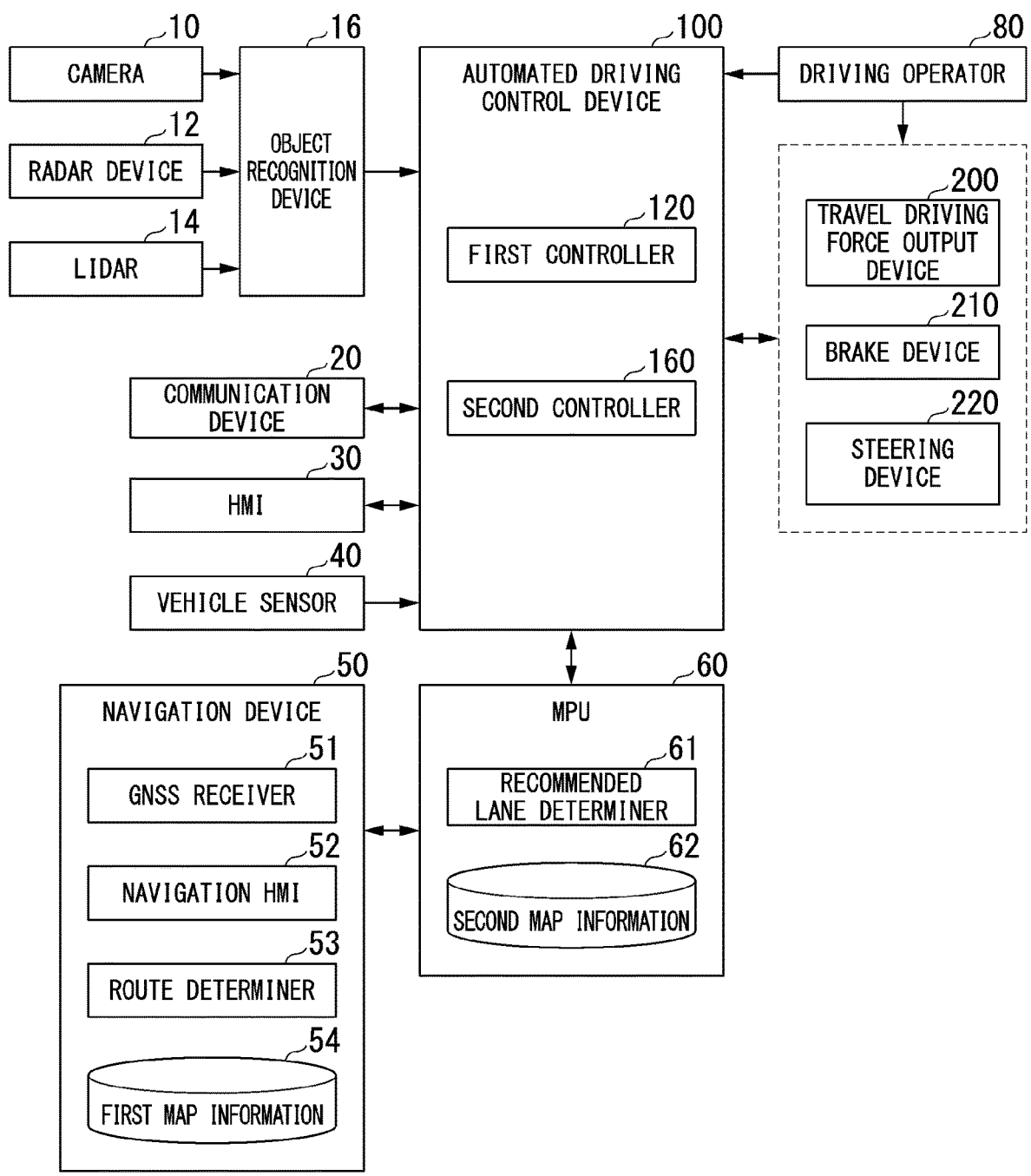
FIG. 1 is a configuration diagram of a vehicle system using a vehicle control device according to an embodiment.

FIG. 1 is a configuration diagram of a vehicle system 1 using a vehicle control device according to an embodiment. A vehicle, in which the vehicle system 1 is installed, is a vehicle with two wheels, three wheels, four wheels and the like, for example, and its driving source is an internal combustion engine such as a diesel engine and a gasoline engine, an electric motor, or a combination thereof. The electric motor operates by using power generated by a generator connected to the internal combustion engine or power discharged from a secondary cell or a fuel cell.

The vehicle system 1 includes, for example, a camera 10, a radar device 12, a light detection and ranging (LIDAR) 14, an object recognition device 16, a communication device 20, a human machine interface (HMI) 30, a vehicle sensor 40, a navigation device 50, a map positioning unit (MPU) 60, a driving operator 80, an automated driving control device 100, a travel driving force output device 200, a brake device 210, and a steering device 220. These devices and equipment are connected to one another via a multiplex communication line such as a controller area network (CAN) communication line, a serial communication line, a wireless communication network, and the like. The configuration shown in FIG. 1 is merely an example, and a part of the configuration may be omitted, or other configurations may be added.

The camera 10 is, for example, a digital camera using a solid-state imaging element such as a charge coupled device (CCD) and a complementary metal oxide semiconductor (CMOS). The camera 10 is mounted at arbitrary places on the vehicle (hereinafter, referred to as a self-vehicle M) in which the vehicle system 1 is installed. In the case of capturing an image of an area in front of the self-vehicle M, the camera 10 is mounted on an upper part of a front windshield, on a rear surface of a rear-view mirror, and the like. The camera 10, for example, periodically and repeatedly captures the surroundings of the self-vehicle M. The camera 10 may be a stereo camera.

The radar device 12 emits radio waves such as millimeter waves to the surroundings of the self-vehicle M, detects radio waves (reflected waves) reflected by an object, and detects at least the position (the distance and the orientation) of the object.

The radar device 12 is mounted at arbitrary places on the self-vehicle M. The radar device 12 may detect the position and the speed of the object by a frequency modulated continuous wave (FM-CW) scheme.

The LIDAR 14 emits light (or electromagnetic waves having a wavelength close to that of light) to the surroundings of the self-vehicle M and measures scattered light. The LIDAR 14 detects a distance to a target on the basis of a time from light emission to light reception. The emitted light is a pulsed laser beam, for example. The LIDAR 14 is mounted at arbitrary places on the self-vehicle M.

The object recognition device 16 performs a sensor fusion process on results of detection by some or all of the camera 10, the radar device 12, and the LIDAR 14, thereby recognizing the position, the type, the speed and the like of an object. The object recognition device 16 outputs a recognition result to the automated driving control device 100. The object recognition device 16 may output the detection results of the camera 10, the radar device 12, and the LIDAR 14 to the automated driving control device 100 as is. The object recognition device 16 may be omitted from the vehicle system 1.

The communication device 20 communicates with other vehicles present around the self-vehicle M, or communicates with various server devices via a wireless base station by using, for example, a cellular network, a Wi-Fi network, Bluetooth (registered trademark), dedicated short range communication (DSRC) and the like.

The HMI 30 presents various types of information to an occupant of the self-vehicle M and receives an input operation of the occupant. The HMI 30 includes various display devices, speakers, buzzers, touch panels, switches, keys, and the like.

The vehicle sensor 40 includes a vehicle speed sensor that detects the speed of the self-vehicle M, an acceleration sensor that detects acceleration, a yaw rate sensor that detects an angular velocity around a vertical axis, a direction sensor that detects the direction of the self-vehicle M, and the like.

The navigation device 50 includes, for example, a global navigation satellite system (GNSS) receiver 51, a navigation HMI 52, and a route determiner 53. The navigation device 50 stores first map information 54 in a storage device such as a hard disk drive (HDD) and a flash memory. The GNSS receiver 51 specifies the position of the self-vehicle M on the basis of a signal received from a GNSS satellite. The position of the self-vehicle M may be specified or complemented by an inertial navigation system (INS) using the output of the vehicle sensor 40. The navigation HMI 52 includes a display device, a speaker, a touch panel, keys and the like. The navigation HMI 52 may be partially or entirely shared with the aforementioned HMI 30. The route determiner 53 determines, for example, a route (hereinafter, referred to as a route on a map) to a destination, which is input by an occupant using the navigation HMI 52, from the position of the self-vehicle M specified by the GNSS receiver 51 (or any input position) with reference to the first map information 54. The first map information 54 is, for example, information in which a road shape is expressed by links indicating a road and nodes connected by the links. The first map information 54 may include a road curvature, point of interest (POI) information, and the like. The route on the map is output to the MPU 60. The navigation device 50 may provide route guidance using the navigation HMI 52 on the basis of the route on the map. The navigation device 50 may be implemented by, for example, functions of a terminal device such as a smart phone and a tablet terminal owned by an occupant. The navigation device 50 may transmit the current position and the destination to a navigation server via the communication device 20, and acquire a route equivalent to the route on the map from the navigation server.

The MPU 60 includes, for example, a recommended lane determiner 61 and stores second map information 62 in a storage device such as an HDD and a flash memory. The recommended lane determiner 61 divides the route on the map provided from the navigation device 50 into a plurality of blocks (for example, divides the route on the map every 100 m in the vehicle travel direction), and determines a recommended lane for each block with reference to the second map information 62. The recommended lane determiner 61 determines which lane to travel from the left. When there is a branch point on the route on the map, the recommended lane determiner 61 determines a recommended lane such that the self-vehicle M can travel on a reasonable route for traveling to a branch destination.

The second map information 62 is more accurate map information than the first map information 54. The second map information 62 includes, for example, information on the center of a lane, information on the boundary of the lane, and the like. The second map information 62 may include road information, traffic regulation information, address information (address and postal code), facility information, telephone number information, and the like. The second map information 62 may be updated at any time by the communication device 20 communicating with another device.

The driving operator 80 includes, for example, an accelerator pedal, a brake pedal, a shift lever, steering wheel, a deformed steer, a joy stick, and other operators. The driving operator 80 is provided with a sensor for detecting the operation amount or the presence or absence of an operation, and its detection result is output to the automated driving control device 100, or some or all of the travel driving force output device 200, the brake device 210, and the steering device 220.

The automated driving control device 100 includes, for example, a first controller 120 and a second controller 160. Each of the first controller 120 and the second controller 160 is implemented by, for example, a hardware processor such as a central processing unit (CPU) that executes a program (software). Some or all of these components may be implemented by hardware (a circuit unit: including circuitry) such as a large scale integration (LSI), an application specific integrated circuit (ASIC), a field-programmable gate array (FPGA), and a graphics processing unit (GPU), or may be implemented by software and hardware in cooperation. The program may be stored in advance in a storage device (storage device including a non-transitory storage medium) such as an HDD and a flash memory of the automated driving control device 100, or may be installed in the HDD and the flash memory of the automated driving control device 100 when a detachable storage medium (non-transitory storage medium) storing the program, such as a DVD and a CD-ROM, is mounted on a drive device. The automated driving control device 100 is an example of a "vehicle control device".

Figure 2:
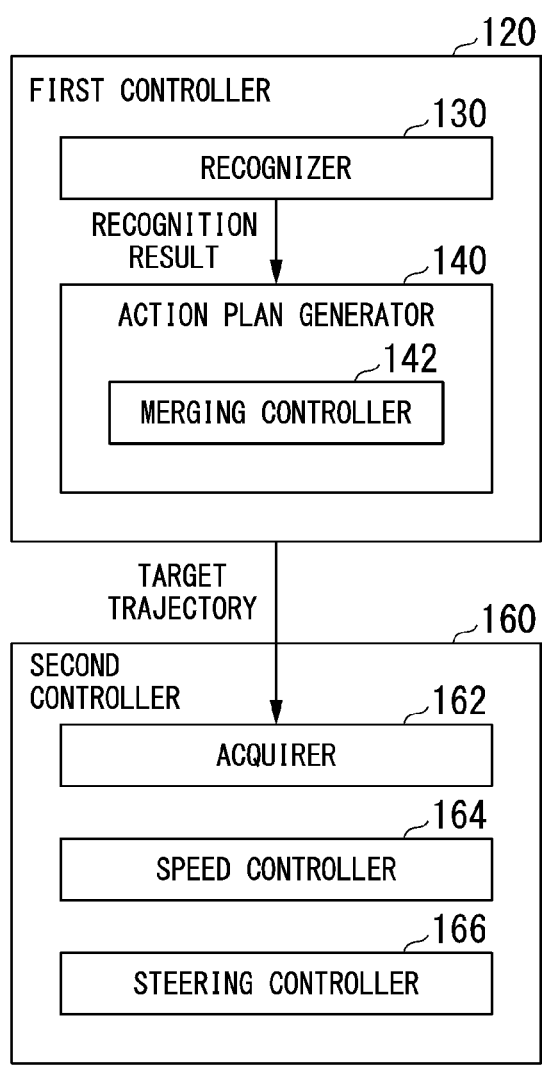
FIG. 2 is a functional configuration diagram of a first controller and a second controller.

FIG. 2 is a functional configuration diagram of the first controller 120 and the second controller 160. The first controller 120 includes, for example, a recognizer 130 and an action plan generator 140. The first controller 120 performs, for example, a function based on an artificial intelligence (AI) and a function based on a predetermined model in parallel. For example, a function of "recognizing an intersection" may be implemented by performing intersection recognition by deep learning and the like and recognition based on a predetermined condition (pattern matching signals, road markings, and the like) in parallel, or scoring both recognition and comprehensively evaluating them. In this way, the reliability of automated driving is ensured.

The recognizer 130 recognizes a state such as the position, speed, acceleration and the like of an object around the self-vehicle M on the basis of information input from the camera 10, the radar device 12, and the LIDAR 14 via the object recognition device 16. The position of the object is recognized as, for example, the position on absolute coordinates with a representative point (center of gravity, the center of the drive axis, and the like) of the self-vehicle M as the origin, and is used for control. The position of the object may be represented by a representative point of the center of gravity, a corner, and the like of the object, or may be represented by an indicated area. The "state" of the object may include an acceleration, a jerk, or an "action state" (for example, whether a lane change is being performed or is intended to be performed) of the object.

The recognizer 130 recognizes, for example, a lane (a travel lane) in which the self-vehicle M is traveling. For example, the recognizer 130 compares a pattern (for example, an arrangement of solid lines and broken lines) of road marking lines obtained from the second map information 62 with a pattern of road marking lines around the self-vehicle M, which is recognized from the image captured by the camera 10, thereby recognizing the travel lane. The recognizer 130 may recognize the travel lane by recognizing not only the road marking lines but also a traveling road boundary (road boundary) including the road marking lines, a road shoulder, a curb, a median strip, a guardrail, and the like. In this recognition, the position of the self-vehicle M acquired from the navigation device 50 or a processing result of the INS may be taken into consideration. The recognizer 130 recognizes a temporary stop line, an obstacle, a red light, a tollgate, and other road events.

When recognizing the travel lane, the recognizer 130 recognizes the position and the orientation of the self-vehicle M with respect to the travel lane. The recognizer 130, for example, may recognize, as the relative position and the orientation of the self-vehicle M with respect to the travel lane, a deviation of a reference point of the self-vehicle M from a center of a lane and an angle formed with respect to a line connecting the center of the lane in the progress direction of the self-vehicle M. Instead of this, the recognizer 130 may recognize the position and the like of the reference point of the self-vehicle M with respect to any one of the side ends (the road marking line or the road boundary) of the travel lane as the relative position of the self-vehicle M with respect to the travel lane.

The recognizer 130 recognizes the position and the speed of the self-vehicle M. The recognizer 130 recognizes the position and the speed of a main lane vehicle (hereinafter, referred to as a main lane vehicle mA) traveling in a main lane, which is a merging destination, when the self-vehicle M is travelling on a merging path.

The action plan generator 140 generates a target trajectory along which the self-vehicle M will travel in the future automatically (independent of a driver's operation) so as to be able to travel in the recommended lane determined by the recommended lane determiner 61 in principle and further to cope with surrounding situations of the self-vehicle M. The target trajectory includes a speed element, for example. For example, the target trajectory is represented as a sequence of points (trajectory points) to be reached by the self-vehicle M. The trajectory point is a point that the self-vehicle M is to reach every predetermined travel distance (for example, about several meters) as a road distance, and a target speed and a target acceleration at every predetermined sampling time (for example, about several tenths of a [sec]) are separately generated as a part of the target trajectory. The trajectory point may be a position that the self-vehicle M is to reach at the sampling time for each predetermined sampling time. In such a case, information on the target speed and the target acceleration is represented by the interval between the trajectory points.

When generating the target trajectory, the action plan generator 140 may set events for automated driving. The events for automated driving include constant speed travel events, low speed travel events, lane change events, branch events, merge events, takeover events, and the like. The action plan generator 140 generates the target trajectory according to an activated event.

The action plan generator 140 includes, for example, a merging controller 142. The merging controller 142 generates a first plan for changing the lane of the self-vehicle M to in front of or behind another vehicle in the main lane of the merging destination on the basis of the relative relationship between the position and the speed of the self-vehicle M and the position and the speed of the main lane vehicle. Details of this process will be described below.

The relative relationship includes, for example, a relative position between the self-vehicle M and the main lane vehicle and a relative speed between the self-vehicle M and the main lane vehicle. The relative relationship is, for example, information for deriving an index for quantifying an interference risk (or the degree of interference influence) of the self-vehicle M and the main lane vehicle mA. The index is a speed difference between the self-vehicle M and the main lane vehicle, a time to collision (hereinafter, referred to as TTC) between the self-vehicle M and the main lane vehicle, and a time headway (hereinafter, referred to as THW) between the self-vehicle M and the main lane vehicle.

The second controller 160 controls the travel driving force output device 200, the brake device 210, and the steering device 220 such that the self-vehicle M passes through the target trajectory generated by the action plan generator 140 at scheduled times.

Returning to FIG. 2, the second controller 160 includes, for example, an acquirer 162, a speed controller 164, and a steering controller 166. The acquirer 162 acquires information on the target trajectory (trajectory points) generated by the action plan generator 140 and stores the information in a memory (not shown). The speed controller 164 controls the travel driving force output device 200 or the brake device 210 on the basis of a speed element associated with the target trajectory stored in the memory. The steering controller 166 controls the steering device 220 according to the degree of bending of the target trajectory stored in the memory. The processes of the speed controller 164 and the steering controller 166 are implemented by, for example, a combination of feedforward control and feedback control. As an example, the steering controller 166 performs a combination of feedforward control according to the curvature of a road in front of the self-vehicle M and feedback control based on a deviation from the target trajectory.

The travel driving force output device 200 outputs a travel driving force (torque) for driving the vehicle to driving wheels. The travel driving force output device 200 includes, for example, a combination of an internal combustion engine, an electric motor, a transmission and the like, and an electronic controller (ECU) for controlling them. The ECU controls the aforementioned configuration according to information input from the second controller 160 or information input from the driving operator 80.

The brake device 210 includes, for example, a brake caliper, a cylinder for transferring hydraulic pressure to the brake caliper, an electric motor for generating the hydraulic pressure in the cylinder, and a brake ECU. The brake ECU controls the electric motor according to the information input from the second controller 160 or the information input from the driving operator 80, thereby allowing a brake torque corresponding to a brake operation to be output to each wheel. The brake device 210 may have a backup mechanism for transferring the hydraulic pressure generated by an operation of the brake pedal included in the driving operator 80 to the cylinder via a master cylinder. The brake device 210 is not limited to the aforementioned configuration and may be an electronically controlled hydraulic pressure brake device that controls an actuator according to the information input from the second controller 160, thereby transferring the hydraulic pressure of the master cylinder to the cylinder.

The steering device 220 includes, for example, a steering ECU and an electric motor. The electric motor, for example, changes a direction of a steering wheel by allowing a force to act on a rack and pinion mechanism. The steering ECU drives the electric motor according to the information input from the second controller 160 or the information input from the driving operator 80, thereby changing the direction of the steering wheel.

[Function of Merging Controller]

Hereinafter, details of the functions of the merging controller 142 will be described. On the basis of the relative relationship between the position and the speed of the self-vehicle M and the position and the speed of the main lane vehicle mA, the merging controller 142 determines whether the self-vehicle M will merge in front of or behind the main lane vehicle mA.

Figure 3:
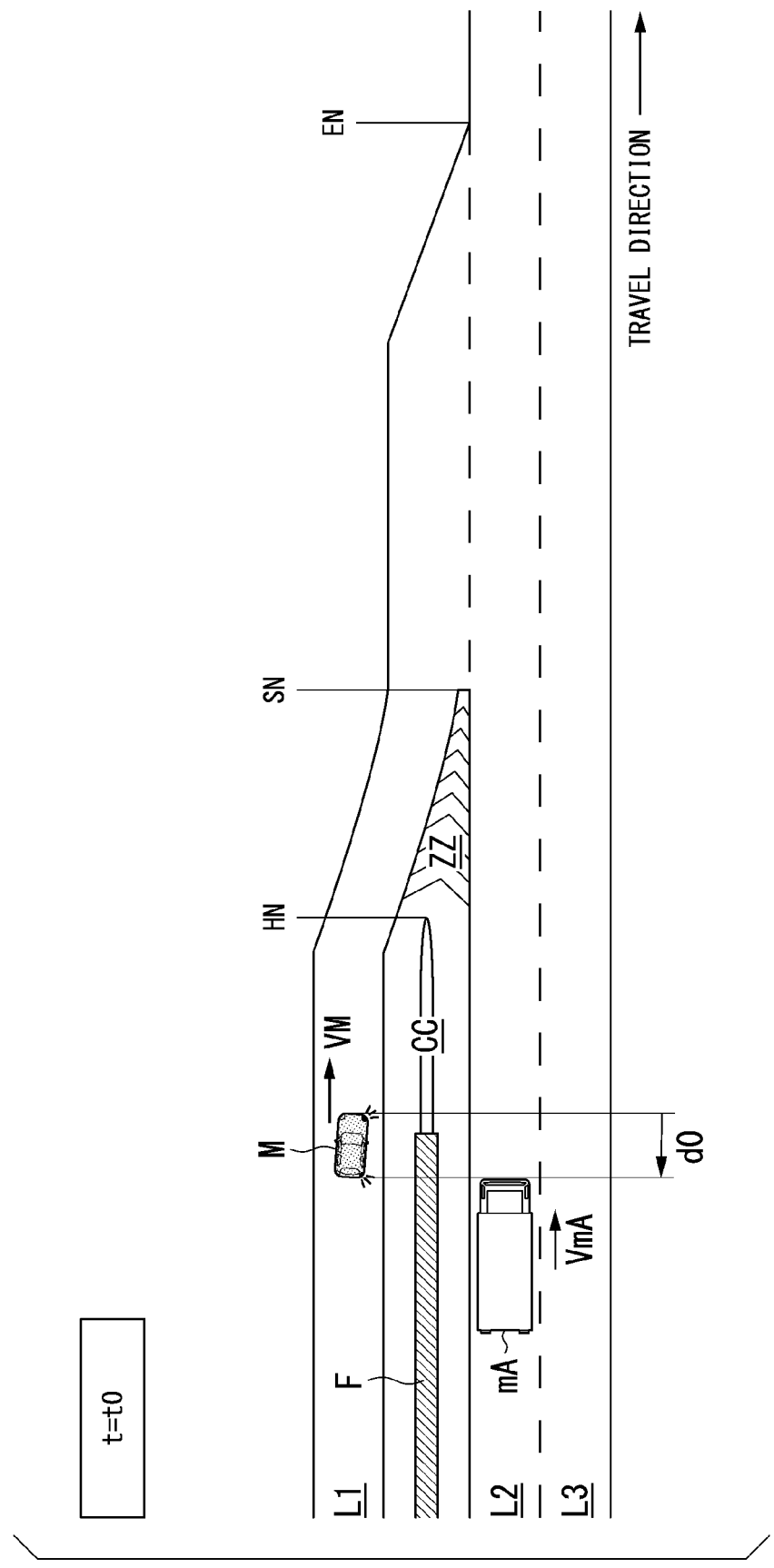
FIG. 3 is a diagram showing a first scene.

FIG. 3 is a diagram showing a first scene. The first scene is a scene at the time t0. The time t0 is, for example, the timing at which the recognizer 130 of the self-vehicle M has started to recognize the position, the speed, and the like of the main lane vehicle mA.

The example of FIG. 3 shows main lanes (lane L2 and lane L3) extending along an arrow of the shown travel direction and a merging lane (lane L1) that merges from the left side with respect to the travel direction of the lane L2. The self-vehicle M is automatically driven along a route to a destination set by the navigation device 50, and is traveling in the lane L1 toward a merging point (or merging area and its definition will be described below). It is assumed that there is no stop line near the merging point and the main lane vehicle mA is traveling in the lane L2.

The lane L1 and the main lanes L2 and L3 are separated by a fence F, a branch zone CC, a zebra zone (buffer zone) ZZ, and the like on a side in front of the merging point in the travel direction of each vehicle. The fence F and the branch zone CC physically separate the lane L1 and the lane L2, while the zebra zone ZZ is drawn on a road surface and does not physically separate the lane L1 and the lane L2. The fence F may have a height to the extent that a driver present in one of the lane L1 and the lane L2 is not able to be visually recognized on situation in the other lane.

The merging point is a point where the lane L1 and the lane L2 are connected, and includes, for example, a region from a soft nose SN and an end nose EN of the lane L1. The self-vehicle M needs to merge into the lane L2 while traveling in the region from the soft nose SN and the end nose EN. It is assumed that even though the self-vehicle M is physically able to pass through the zebra zone ZZ where traffic is restricted by law, the self-vehicle M does not merge into the lane L2 by passing through the zebra zone ZZ.

The merging controller 142, for example, selects the main lane vehicle mA between the timing when a reference position (the vehicle head, the center of gravity, the center of a front wheel axis, the center of a rear wheel axis, and the like) of the self-vehicle M reaches the branch zone CC and the timing when the reference position of the self-vehicle M reaches the soft nose SN which is the end of the zebra zone ZZ. For example, when recognizing a plurality of vehicles traveling in the lane L2, the merging controller 142 selects, as the main lane vehicle mA, a vehicle close to the self-vehicle M among the plurality of vehicles, or a vehicle close to the self-vehicle M and located behind the self-vehicle M in the travel direction thereof. In this way, the merging controller 142 can perform merging control by selecting either the front or the rear of the main lane vehicle mA, which is suitable for the self-vehicle M.

At the time t0, the merging controller 142 acquires the speed VM of the self-vehicle M, the position of the self-vehicle M, the position of the main lane vehicle mA, and the speed of the main lane vehicle mA.

In the example of FIG. 3, at the time t0, the merging controller 142 recognizes that the reference position of the self-vehicle M is ahead of the reference position of the main lane vehicle mA by a distance d0 in the travel direction. The merging controller 142 acquires the relative speed between the self-vehicle M and the main lane vehicle mA from the speed VM of the self-vehicle M and the speed VmA of the main lane vehicle mA.

Figure 4:
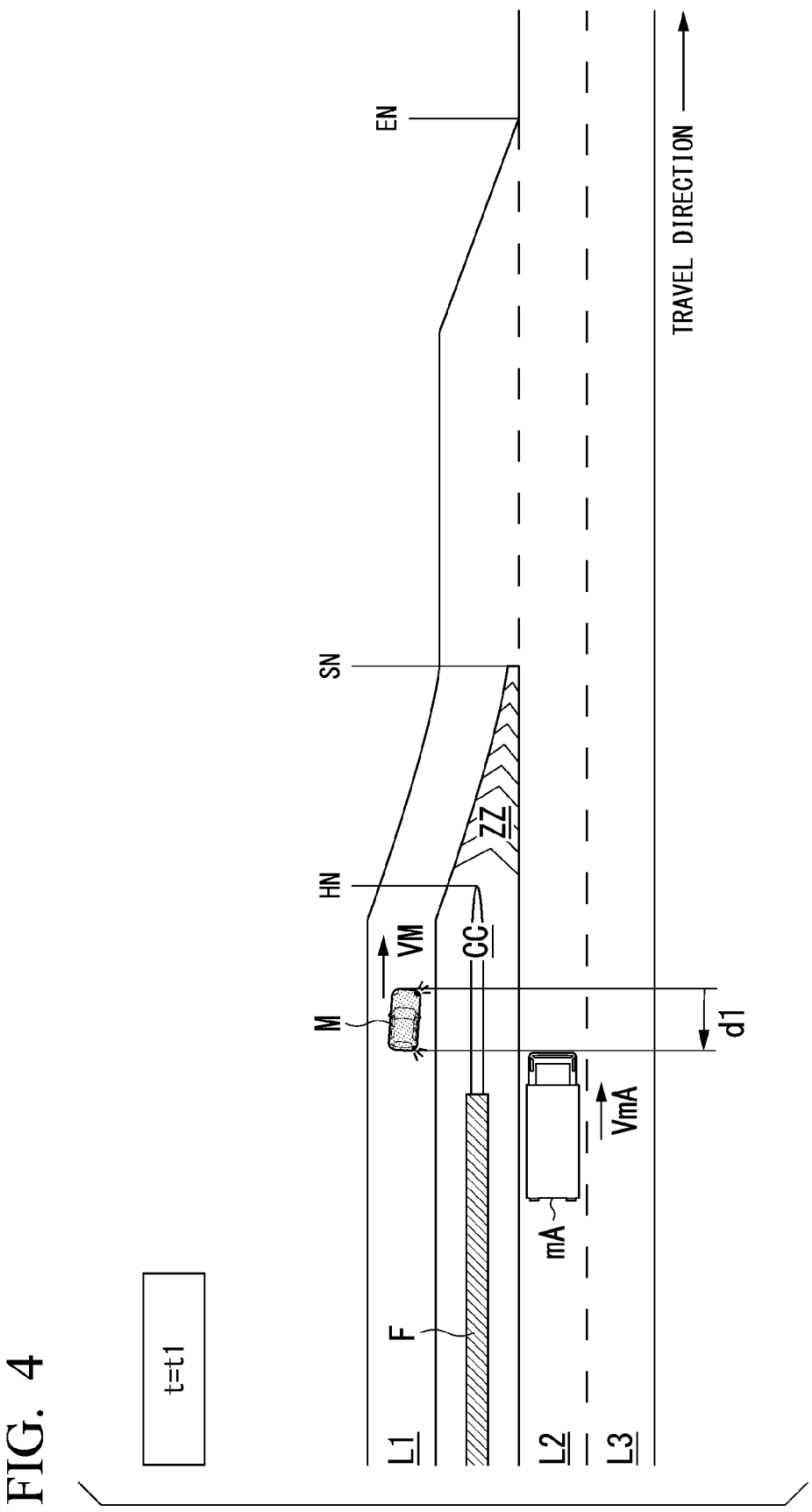
FIG. 4 is a diagram showing a second scene.

FIG. 4 is a diagram showing a second scene. The second scene is a scene at time t1 when the time has elapsed from the time t0. At the time t1, the merging controller 142 acquires the speed VM of the self-vehicle M, the position of the self-vehicle M, the position of the main lane vehicle mA, and the speed of the main lane vehicle mA. The merging controller 142 detects the relative relationship that the reference position of the self-vehicle M is ahead of the reference position of the main lane vehicle mA by a distance d1 in the travel direction.

In the second scene, since it is able to continuously recognize the position of the main lane vehicle mA that is not clearly recognizable in the first scene, when the position of the self-vehicle M with respect to the travel direction on the merging path to the main lane L2 is in front of a predetermined position and the relative relationship is in a predetermined state, the merging controller 142 performs a control of changing the relative relationship with the main lane vehicle by controlling the acceleration/deceleration of the self-vehicle M. The predetermined position is a position determined by a road structure.

The "position of the self-vehicle M is in front of the predetermined position" means, for example, that the self-vehicle M is in front of a position where a lane change is possible, and more specifically, means a position between a hard node HN where the self-vehicle M can perform a lane change by law and the soft nose SN as shown in FIG. 3 and FIG. 4.

The "relative relationship satisfies the predetermined state" includes, for example, that a position reference based on the relative positional relationship between the self-vehicle M and the main lane vehicle mA and a speed reference based on the relative speed relationship between the self-vehicle M and the main lane vehicle mA satisfy the predetermined state. The "relative relationship satisfies the predetermined state" means that an index for quantifying an interference risk between the self-vehicle M and the main lane vehicle mA indicates the predetermined state. Specifically, the "relative relationship satisfies the predetermined state" includes that one or more elements of the TTC of the self-vehicle M and the main lane vehicle mA, the speed difference between the self-vehicle M and the main lane vehicle mA, the THW between the self-vehicle M and the main lane vehicle mA are in the predetermined state. Details of the predetermined state will be described below.

The "changing the relative relationship with the main lane vehicle by controlling the acceleration/deceleration of the self-vehicle M" includes that the self-vehicle M decelerates and merges behind the main lane vehicle mA, the self-vehicle M further accelerates and merges in front of the main lane vehicle mA, and the like.

When the position of the self-vehicle M with respect to the travel direction on the merging path to the main lane L2 is behind the predetermined position and the relative relationship satisfies the predetermined state, the merging controller 142 suppresses the acceleration control of the self-vehicle M and performs control to merge behind the main lane vehicle mA by deceleration control of the self-vehicle M.

[Example of Travel Trajectory of Vehicle]

Figure 5:
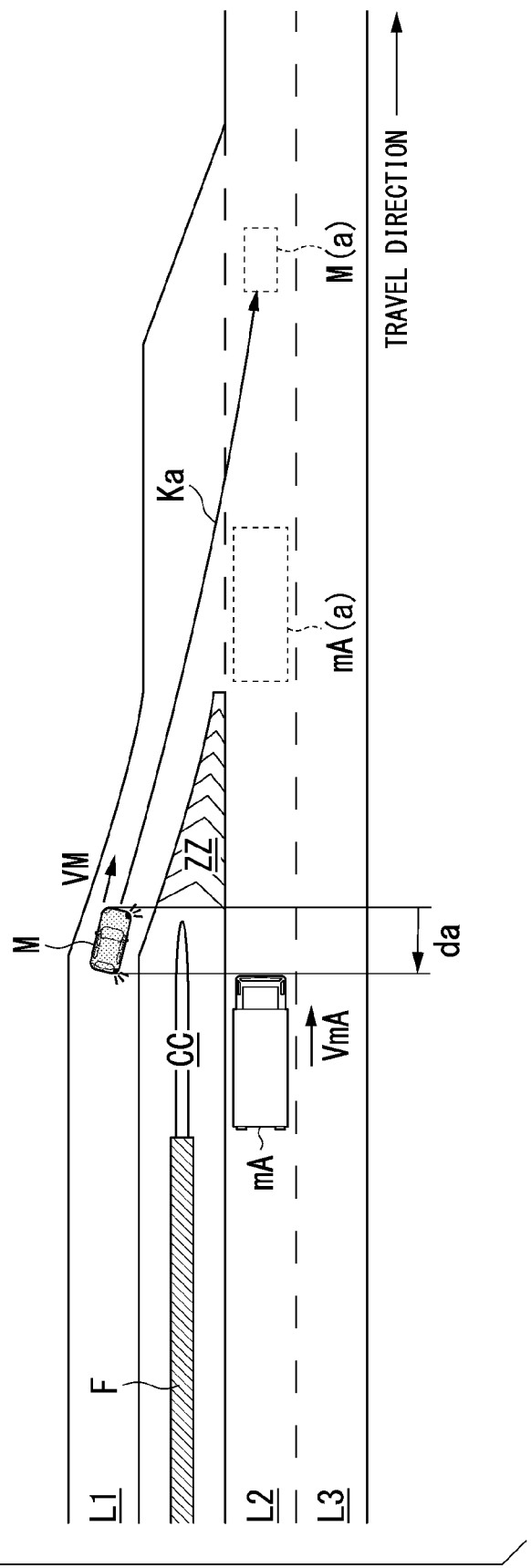
FIG. 5 is a diagram showing a third scene.

FIG. 5 is a diagram showing a third scene. The third scene is a scene at time t2 when the time has elapsed from the time t1. FIG. 5 is a diagram showing an example of the travel trajectory of the self-vehicle M based on the control of the merging controller 142. In the following description, an example in which the self-vehicle M shown in FIG. 5 merges in front of the main lane vehicle mA will be referred to as "case a". In the scene of FIG. 5, for example, the merging controller 142 acquires the relative relationship that the speed VM of the self-vehicle M is relatively faster than the speed VmA of the main lane vehicle mA and the reference position of the self-vehicle M is ahead of the reference position of the main lane vehicle mA by a distance da in the travel direction at the time t2 after a predetermined time elapses from the time t1. The merging controller 142 determines that the self-vehicle M will merge in front of the main lane vehicle mA on the basis of the acquired relative relationship.

The action plan generator 140 generates a target trajectory Ka on the basis of the determination result of the merging controller 142. The merging controller 142 controls the acceleration of the self-vehicle M as necessary. An example of the positions of the self-vehicle M and the main lane vehicle mA at the time of completion of the merging control is indicated by broken lines M (a) and mA (a) in the drawing.

Figure 6:
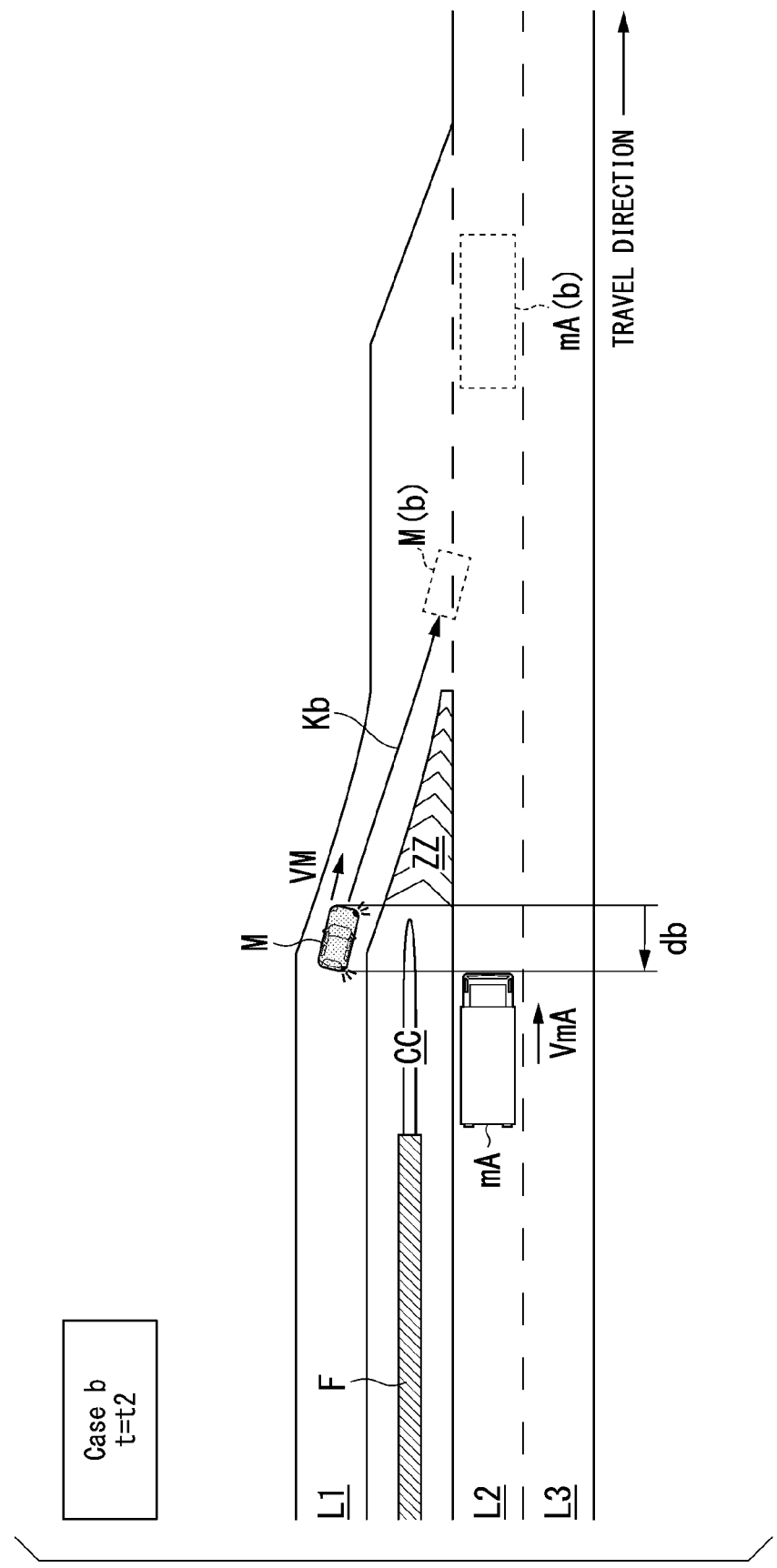
FIG. 6 is a diagram showing a fourth scene.

FIG. 6 is a diagram showing a fourth scene. The fourth scene is a scene indicating the time t2 of a scene different from the third scene of FIG. 5 described above. In the following description, an example in which the self-vehicle M shown in FIG. 6 merges in the direction of the main lane vehicle mA will be referred to as "case b".

For example, at the time t2, the merging controller 142 recognizes that the speed VM of the self-vehicle M is relatively slower than the speed VmA of the main lane vehicle mA and the reference position of the self-vehicle M is ahead of the reference position of the main lane vehicle mA by a distance db in the travel direction. The distance db may be a distance shorter than the distance da shown in FIG. 5 described above, and the reference position of the main lane vehicle mA may be a distance located ahead of the reference position of the self-vehicle M in the travel direction. The merging controller 142 determines to allow the self-vehicle M to merge behind the main lane vehicle mA on the basis of the relative relationship.

The action plan generator 140 generates a target trajectory Kb on the basis of the determination result of the merging controller 142. The merging controller 142 controls the acceleration of the self-vehicle M as necessary. An example of the positions of the self-vehicle M and the main lane vehicle mA at the time of completion of the merging control is indicated by broken lines M (b) and mA (b) in the drawing.

[Regarding Predetermined State]

Figure 7:
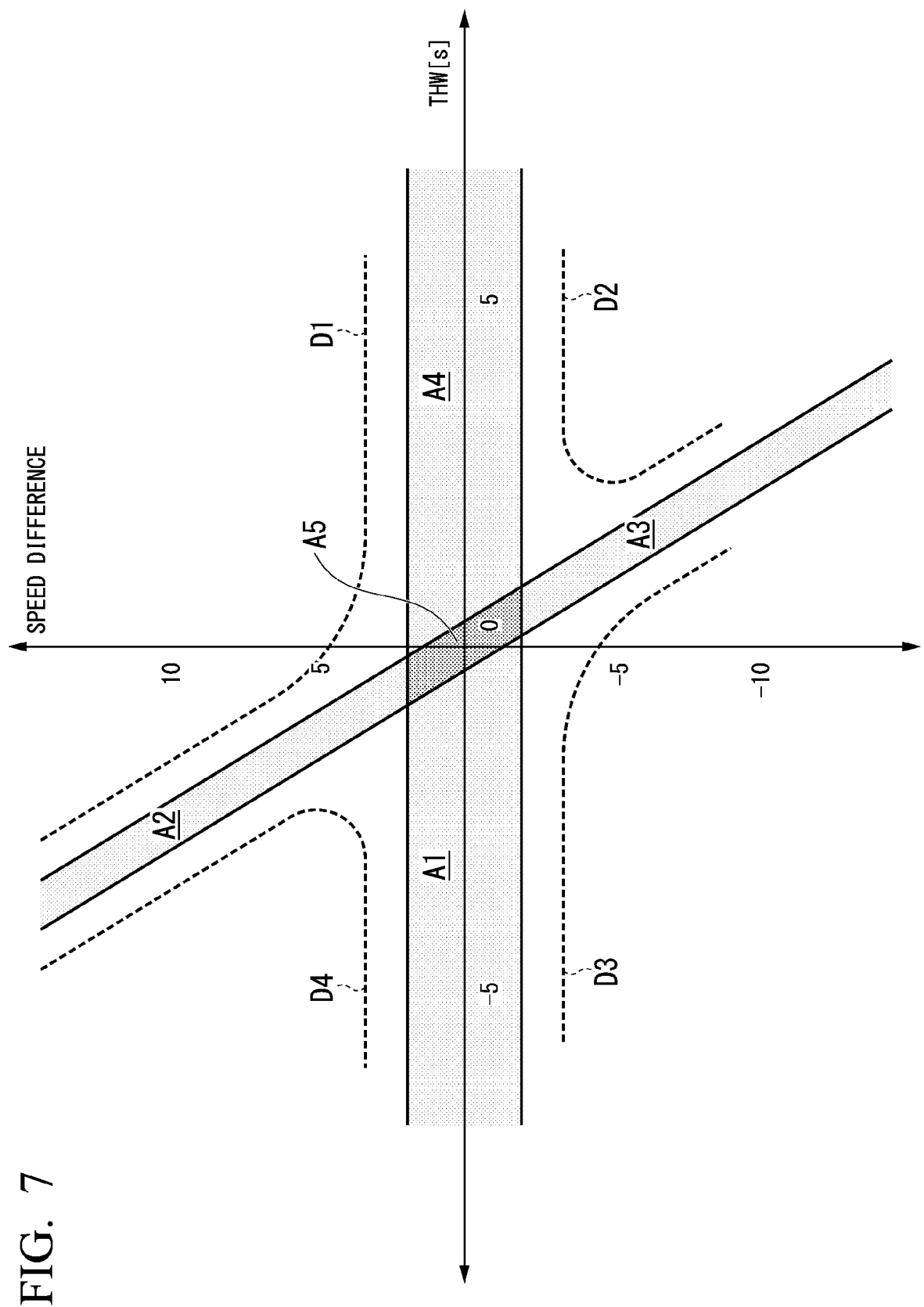
FIG. 7 is a diagram showing a graph that visualizes determination information including a predetermined state.

"Satisfying the predetermined state" means, for example, that both the fact that the reference position of the self-vehicle M (when the merging controller 142 has obtained the relative relationship between the self-vehicle M and the main lane vehicle mA or before the predetermined position) is located with a predetermined distance before or after the reference position of the main lane vehicle mA in the travel direction and the fact that the relative relationship between the self-vehicle M and the main lane vehicle mA to be shown below is included in a predetermined region shown in FIG. 7 are satisfied (region surrounded by regions A1 to A5 or broken lines D1 to D4). That is, satisfying the predetermined state means that when the self-vehicle M performs a lane change, it is estimated that the self-vehicle M will interfere with the main lane vehicle mA, or when the self-vehicle M performs a lane change, it is estimated that the main lane vehicle mA will be affected. Estimating that the self-vehicle M will interfere or that the main lane vehicle mA will be affected means that since the main lane vehicle mA will accelerate or decelerate more than a predetermined degree due to behavior due to a lane change of the self-vehicle M, it is estimated that behavior different from the behavior when the self-vehicle M does not change lane is indicated.

FIG. 7 is a diagram showing a graph that visualizes determination information including the predetermined state. The merging controller 142 determines by using the determination information whether a target vehicle is in the predetermined state. In the graph shown in FIG. 7, when the vertical axis is defined as a speed difference and the horizontal axis is defined as THW, the relative relationship between the self-vehicle M and the main lane vehicle mA is expressed using a coordinate system composed of two axes of the speed difference and the THW. The graph shown in FIG. 7 is an example of "determination information" associated with a criterion that two vehicles will interfere with each other (degree of influence of the lane change of the self-vehicle M on the main lane vehicle) on the basis of the relative relationship between the two vehicles. Hereinafter, the relative relationship between the two vehicles may be simply referred to as a "relative relationship".

The speed difference is, for example, the difference between the speed of the main lane vehicle mA and the speed of the self-vehicle M, and is an index derived on the basis of a value obtained by subtracting the speed of the self-vehicle M from the speed of the main lane vehicle mA. When the speed difference is a positive value, the speed of the main lane vehicle mA is larger than the speed of the self-vehicle M. When the speed difference is a negative value, the speed of the main lane vehicle mA is smaller than the speed of the self-vehicle M. When the THW is a positive value, the main lane vehicle mA is travelling in front of the self-vehicle M. When the THW is a negative value, the main lane vehicle mA is travelling behind the self-vehicle M. The graph shown in FIG. 7 is applied, for example, when the position of the self-vehicle M is ahead of the predetermined position.

Figure 8:
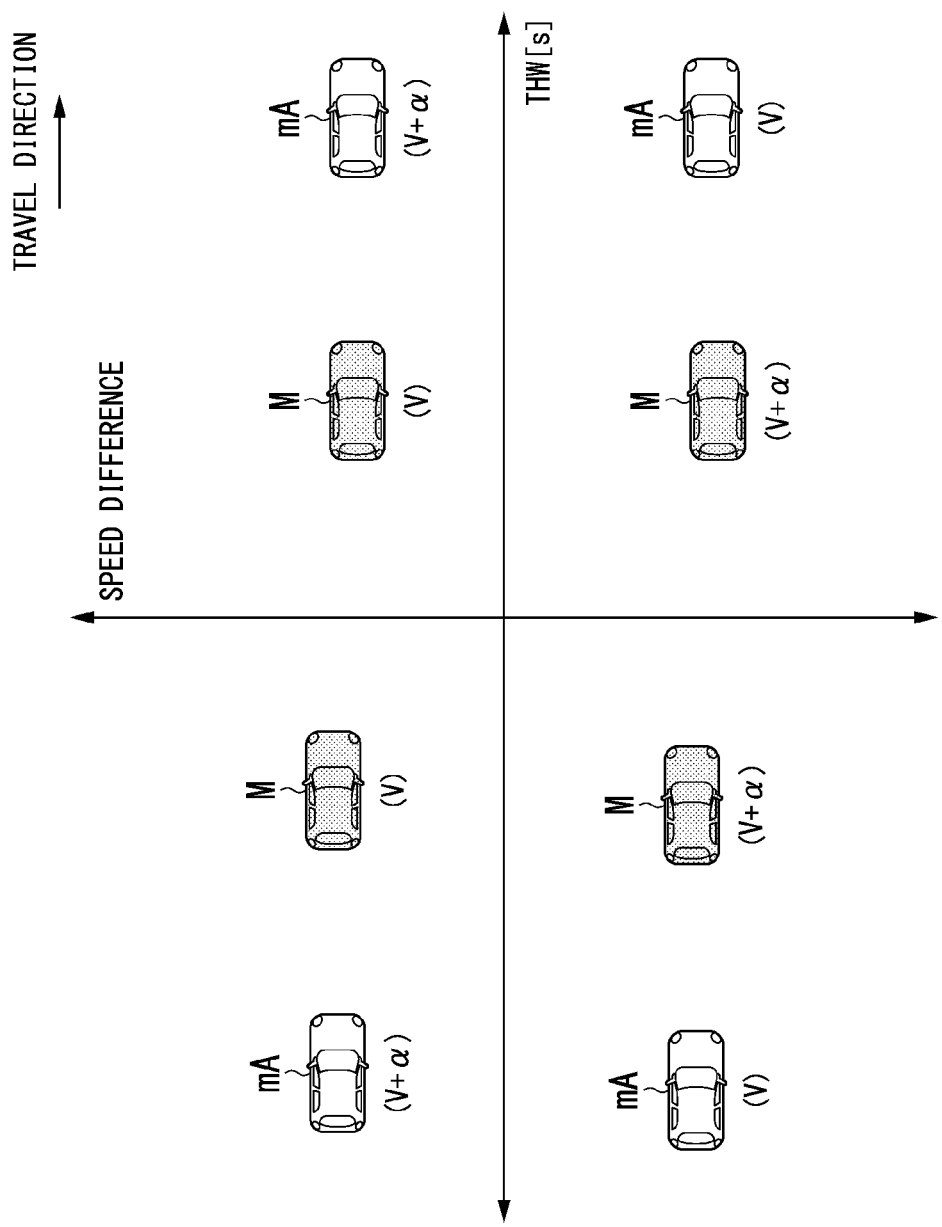
FIG. 8 is a diagram showing the relationship between a self-vehicle and a main lane vehicle in a first quadrant to a fourth quadrant.

The relationship between the self-vehicle M and the main lane vehicle mA in the first quadrant to the fourth quadrant corresponding to FIG. 7 is the relationship shown in FIG. 8.

First quadrant: The main lane vehicle mA is travelling in front of the self-vehicle M and the speed of the main lane vehicle mA is faster than the speed of the self-vehicle M.

Second quadrant: The self-vehicle M is travelling in front of the main lane vehicle mA and the speed of the main lane vehicle mA is faster than the speed of the self-vehicle M.

Third quadrant: The self-vehicle M is travelling in front of the main lane vehicle mA and the speed of the self-vehicle M is faster than the speed of the main lane vehicle mA.

Fourth quadrant: The main lane vehicle mA is travelling in front of the self-vehicle M and the speed of the self-vehicle M is faster than the speed of the main lane vehicle mA.

For example, when the relative relationship is located in the positive direction of the vertical axis with respect to the intersection of the vertical axis and the horizontal axis in FIG. 7 or FIG. 8 described above, this shows a tendency that the self-vehicle M is more likely to be able to merge behind the main lane vehicle mA, and when the relative relationship is located in the negative direction of the vertical axis, this shows a tendency that the self-vehicle M is more likely to be able to merge in front of the main lane vehicle mA.

For example, when the speed difference between the self-vehicle M and the main lane vehicle mA and the THW are located inside the regions A1 to A5 of the graph of FIG. 7 described above, the merging controller 142 determines that the predetermined state is satisfied. Since the regions A1 to A5 are regions indicating that when the self-vehicle M and the main lane vehicle mA travel at the speeds as they are, there is a high likelihood that they will interfere with each other at the merging point, when the relative relationship is within the regions A1 to A5, it is preferable to eliminate such a situation by accelerating or decelerating the self-vehicle M.

For example, in the region A2, since the main lane vehicle mA is present behind the self-vehicle M and the speed of the main lane vehicle mA is faster than the speed of the self-vehicle M, when such a state continues from the predetermined position to the merging point, there is a high possibility that the main lane vehicle mA will catch up with the self-vehicle M and interfere with the self-vehicle M. For example, in the region A3, since the self-vehicle M is present behind the main lane vehicle mA and the speed of the self-vehicle M is faster than the speed of the main lane vehicle mA, when such a state is continued from the predetermined position to the merging point, there is a high possibility that the self-vehicle M will catch up with the main lane vehicle mA and interfere with the main lane vehicle mA. "Satisfying the predetermined state" means that in the graph shown in FIG. 7, coordinates derived by the "speed difference between the self-vehicle M and the main lane vehicle mA and the THW are "located in the regions A1 to A5 (or in the region surrounded by the broken lines D1 to D5 to be described below)".

The slopes of the regions A2, A3, and A5 shown in FIG. 7 are, for example, slopes in which the speed difference changes by about 4 when the THW changes by 1. In order to make it easier for the merging controller 142 to preferentially select that the self-vehicle M merges behind the main lane vehicle mA rather than merging in front of the main lane vehicle mA, the aforementioned slopes are set in the regions A2, A3, and A5. The sizes of the regions A1 to A5 and the slopes of the regions A2, A3, and A5 may also be set according to the performance of the self-vehicle M, setting of an occupant of the self-vehicle M, and the like.

The boundaries of the regions A1 to A5 indicate a threshold value of the relative relationship. When the relative relationship corresponds to the inside of the regions A1 to A5, the merging controller 142 controls the acceleration/deceleration of the self-vehicle M such that the self-vehicle M moves outside the regions A1 to A5 and to a target value indicated by the broken lines D1 to D4 or a position outside the target value.

Figure 9:
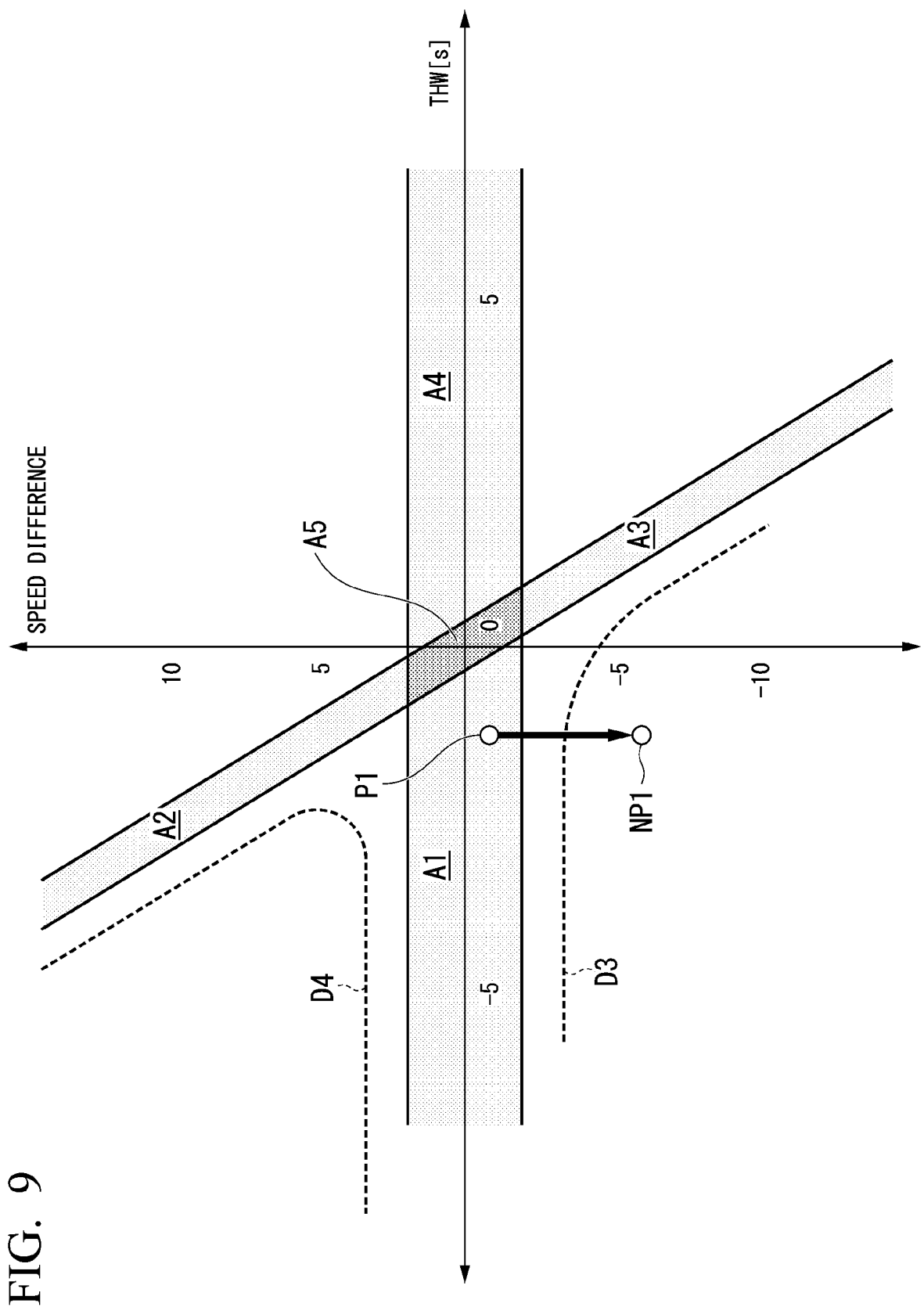
FIG. 9 is a diagram (part 1) showing control based on the graph shown in FIG. 7.

When it is possible to change the relative relationship by acceleration or deceleration, the merging controller 142 determines whether to change the relative relationship by acceleration or deceleration depending on which of the regions A1 to A5 corresponds. FIG. 9 is a diagram showing a specific example in which the merging controller 142 determines whether to change the relative relationship by acceleration or deceleration on the basis of the graph shown in FIG. 7.

[Example of Acceleration Control]

For example, when the relative relationship is a point in the region A1 (point P1 shown in FIG. 9), since the position of the self-vehicle M with respect to the travel direction on the merging path to the main lane L2 is in front of the predetermined position and the relative relationship satisfies the predetermined state, in order to change the relative relationship with the main lane vehicle mA by controlling the acceleration/deceleration of the self-vehicle M, the merging controller 142 accelerates the self-vehicle M such that the relative relationship is a point (or point at a position beyond the broken line D3 starting from point P1 and, for example, point NP1 shown in FIG. 9) on the broken line D3 indicating the target value.

For example, when the relative relationship is a point in the region A2, since the position of the self-vehicle M with respect to the travel direction on the merging path to the main lane L2 is in front of the predetermined position and the relative relationship satisfies the predetermined state, in order to change the relative relationship with the main lane vehicle mA by controlling the acceleration/deceleration of the self-vehicle M, the merging controller 142 accelerates the self-vehicle M such that the relative relationship is a point (or point at a position beyond the broken line D4 starting from a point in the region A2) on the broken line D4 indicating the target value.

[Example of Deceleration Control]

Figure 10:
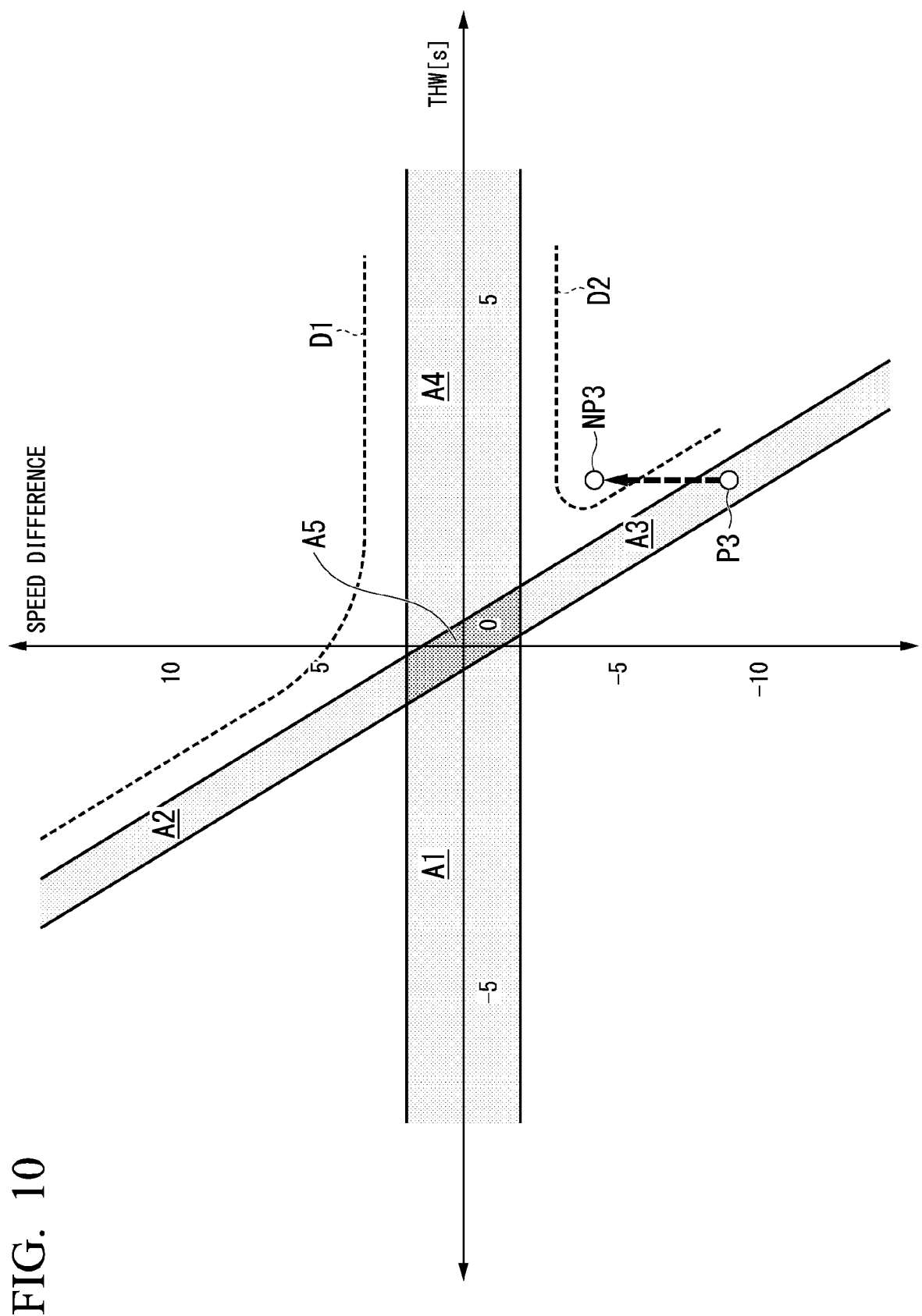
FIG. 10 is a diagram (part 2) showing control based on the graph shown in FIG. 7.

For example, when the relative relationship is a point in the region A3 (point P3 shown in FIG. 10), since the position of the self-vehicle M with respect to the travel direction on the merging path to the main lane L2 is in front of the predetermined position and the relative relationship satisfies predetermined state, the merging controller 142 suppresses the acceleration control of the self-vehicle M, and decelerates the self-vehicle M such that the relative relationship is a point (or point at a position beyond the broken line D2 starting from point P3 and, for example, point NP3 shown in FIG. 10) on the broken line D2 indicating the target value.

Even when the speed difference is a negative value (when the relative relationship is the point P3 in the region A3 as shown in the drawing), the merging controller 142 performs deceleration control instead of acceleration control. This is because when the speed difference and the THW in the state shown in FIG. 10 are close to 0, if it is assumed to perform merging control by allowing the speed VM of the self-vehicle M to be faster than the speed Vma of the main lane vehicle mA, since an acceleration load of the self-vehicle M increases, decelerating the self-vehicle M does not impose a large load on a driving source of the self-vehicle M compared to accelerating the self-vehicle M such that the speed VM of the self-vehicle M greatly exceeds the speed VmA of the main lane vehicle mA, so that suitable traveling can be continued. In a region where the speed difference is a large negative value and the THW is a large positive value, since the position of the main lane vehicle mA in the state shown in FIG. 10 is relatively close to the end nose EN, decelerating the self-vehicle M does not impose a large load on the driving source of the self-vehicle M compared to accelerating the self-vehicle M such that the speed VM of the self-vehicle M greatly exceeds the speed VmA of the main lane vehicle mA, so that suitable traveling can be continued.

For example, when the relative relationship is a point in the region A4, since the position of the self-vehicle M with respect to the travel direction on the merging path to the main lane L2 is in front of the predetermined position and the relative relationship satisfies predetermined state, the merging controller 142 suppresses the acceleration control of the self-vehicle M, and decelerates the self-vehicle M such that the relative relationship is a point (or point at a position beyond the broken line D1 starting from a point in the region A4) on the broken line D1 indicating the target value.

For example, when the relative relationship is a point in the region A5, since the position of the self-vehicle M with respect to the travel direction on the merging path to the main lane L2 is in front of the predetermined position and the relative relationship satisfies predetermined state, the merging controller 142 suppresses the acceleration control of the self-vehicle M, and decelerates the self-vehicle M such that the relative relationship is a point (or point at a position beyond the broken line D1 starting from a point in the region A5) on the broken line D1 indicating the target value.

As described above, when there is a possibility that the self-vehicle M will interfere with the main lane vehicle mA when merging into the main lane, the automated driving control device 100 can control the acceleration/deceleration of the self-vehicle M such that the self-vehicle M does not interfere with the main lane vehicle mA. As a consequence, it is possible to perform more appropriate merging according to traffic conditions.

[Process when there are a Plurality of Main Lane Vehicles]

In a case where it is assumed that the self-vehicle M has changed its lane to a first main lane on the basis of the first plan, when it estimated that on the basis of the position and the speed of a first vehicle or a third vehicle, which is a second vehicle, behind the self-vehicle M and the position and the speed of a fourth vehicle that travels around the third vehicle in a second main lane adjacent to the first main lane, the third vehicle has changed its lane to the second main lane without interfering with the fourth vehicle, the merging controller 142 is configured to allow the self-vehicle M to change its lane to the first main lane on the basis of the first plan.

Figure 11:
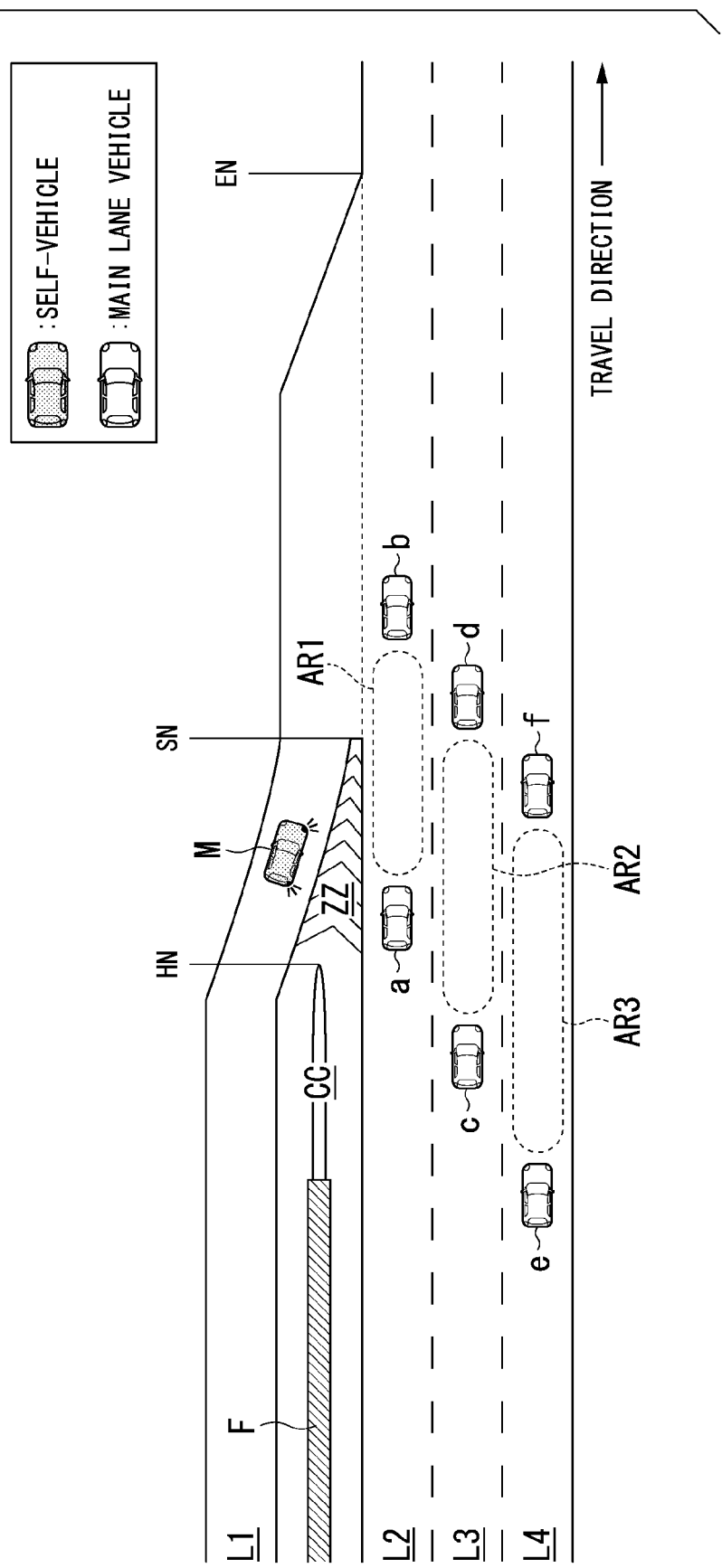
FIG. 11 is a diagram showing an example of a process when there are a plurality of main lane vehicles.

FIG. 11 is a diagram showing an example of a process when there are a plurality of main lane vehicles. In the example of FIG. 11, there are lanes L2 to L4 which are main lanes. The lane L4 is a lane adjacent to the lane L3. A main lane vehicle a and a main lane vehicle b are traveling in the lane L2. A main lane vehicle c and a main lane vehicle d are traveling in the lane L3. A main lane vehicle e and a main lane vehicle f are traveling in the lane L4. With respect to the travel direction thereof, the main lane vehicle b, the main lane vehicle d, the main lane vehicle f, the self-vehicle M, the main lane vehicle a, the main lane vehicle c, and the main lane vehicle e is present in this order. Hereinafter, a region between the main lane vehicle a and the main lane vehicle b may be referred to as a first region AR1, a region between the main lane vehicle c and the main lane vehicle d may be referred to as a second region AR2, and a region between the main lane vehicle e and the main lane vehicle f may be referred to as a third region AR3.

The main lane vehicle a is an example of the first vehicle or the third vehicle. The main lane vehicle c is an example of the fourth vehicle. The main lane vehicle e is an example of a fifth vehicle. The lane L1 is an example of the "merging path". The lane L2 is an example of the "first main lane". The lane L3 is an example of the "second main lane". The lane L4 is an example of the "third main lane".

The automated driving control device 100 derives, on the basis of determination information, the degree of influence of the behavior of the self-vehicle M on the main lane vehicle a when the self-vehicle M has changed its lane to the first region AR1, the degree of influence on the main lane vehicle c when the main lane vehicle a has changed its lane to the second region AR2, and the degree of influence on the main lane vehicle e when the main lane vehicle c has changed its lane to the third region AR3. When the degree of influence is less than a predetermined degree, the self-vehicle M performs a lane change. That is, in a case where it is assumed that the self-vehicle M has performed the lane change, when it is estimated that the self-vehicle M can change its lane to the first region AR1 without interfering with the main lane vehicle a, it is estimated that the main lane vehicle a can change its lane to the second region AR2 without interfering with the main lane vehicle c, and it is estimated that the main lane vehicle c can change its lane to the third region AR3 without interfering with the main lane vehicle e, the self-vehicle M changes its lane to the first region AR1.

The degree of influence is obtained, for example, on the basis of a position where the relative relationship between a vehicle that performs a lane change and a vehicle, which is present in a lane to which a lane is changed, is plotted in FIG. 7 described above. The fact that the degree of influence is less than the predetermined degree means that the degree in which the vehicle, which is the lane change destination, decelerates or accelerates is less than the predetermined degree when the vehicle has performed the lane change. For example, in a case where the relative relationship is plotted on the graph of FIG. 7 described above, when the plotted position is included in any one of the regions A1 to A5 of FIG. 7 described above (or the region surrounded by the broken lines D1 to D4), the degree of influence exceeds the predetermined degree, and when the plotted position is not included in any one of the regions A1 to A5 of FIG. 7 described above, the degree of influence is less than the predetermined degree. The fact that the degree of influence is less than the predetermined degree may mean that two target vehicles are estimated to not interfere with each other.

As described above, on the basis of the relative relationship between a pair of two vehicles (two vehicles to be compared), the merging controller 142 determines whether the self-vehicle M can change its lane to the main lane L2, the main lane vehicle a can change its lane to the main lane L3, and the main lane vehicle c can change its lane to the main lane L4, by using determination information associated with a criterion that the two vehicles will interfere with each other. The two vehicles to be compared are two vehicles (a vehicle that performs a lane change and a vehicle that is present in a lane to which a lane is changed) from which the degree of influence is derived. The merging controller 142 can allow the self-vehicle M to simply perform a lane change such that the lane change of the self-vehicle M does not affect the traveling of the main lane vehicles while reducing a processing load.

Figure 12:
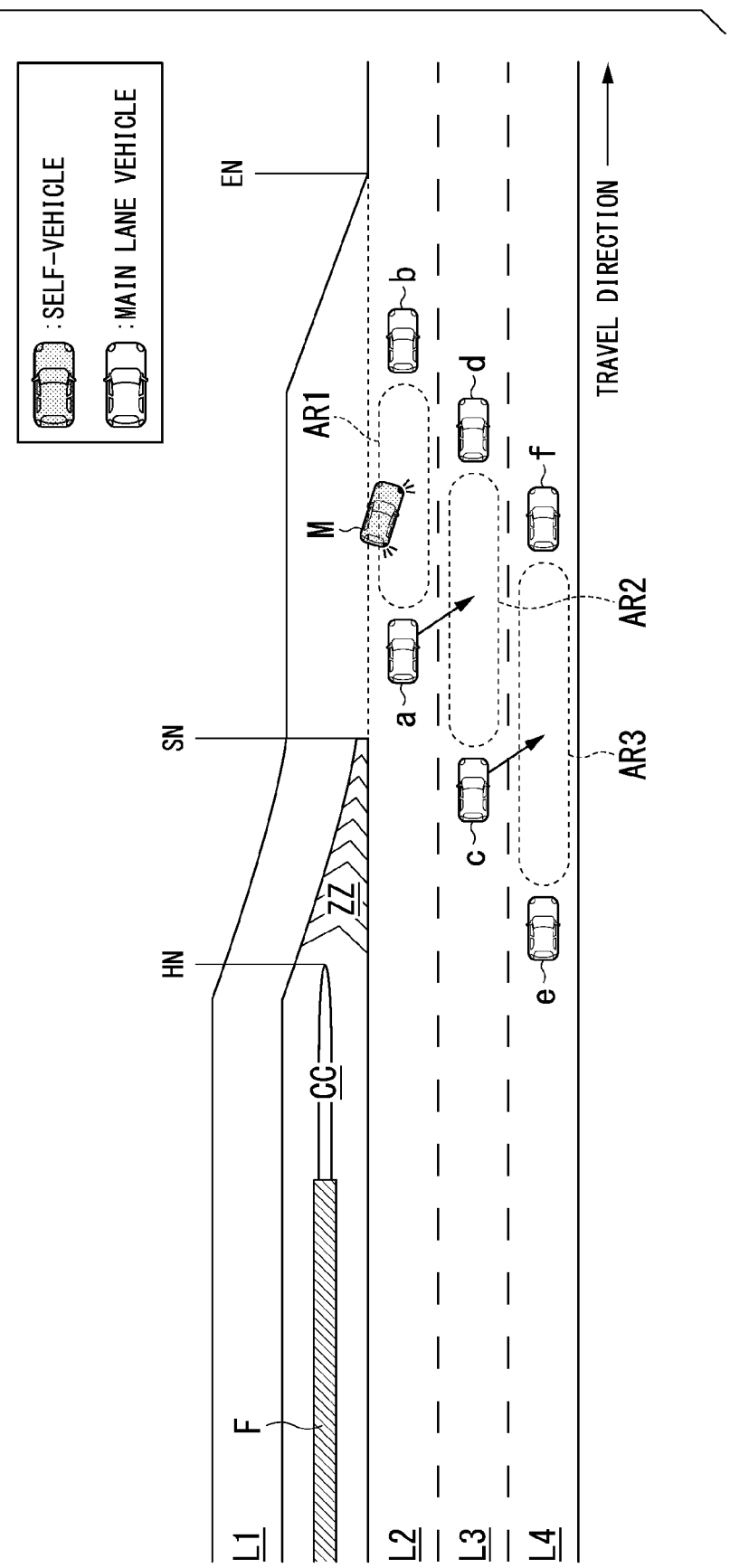
FIG. 12 is a diagram showing an example of a scene in which a self-vehicle M changes its lane to a lane L2.

FIG. 12 is a diagram showing an example of a scene in which the self-vehicle M changes its lane to the lane L2. As shown in FIG. 12, in a case where the self-vehicle M changes its lane to the lane L2, when the self-vehicle M does not affect the traveling of the main lane vehicle a and the main lane vehicle a and the main lane vehicle c do not affect vehicles traveling in adjacent lanes when changing their lanes to the adjacent lanes, the self-vehicle M changes its lane to the lane L2.

Figure 13:
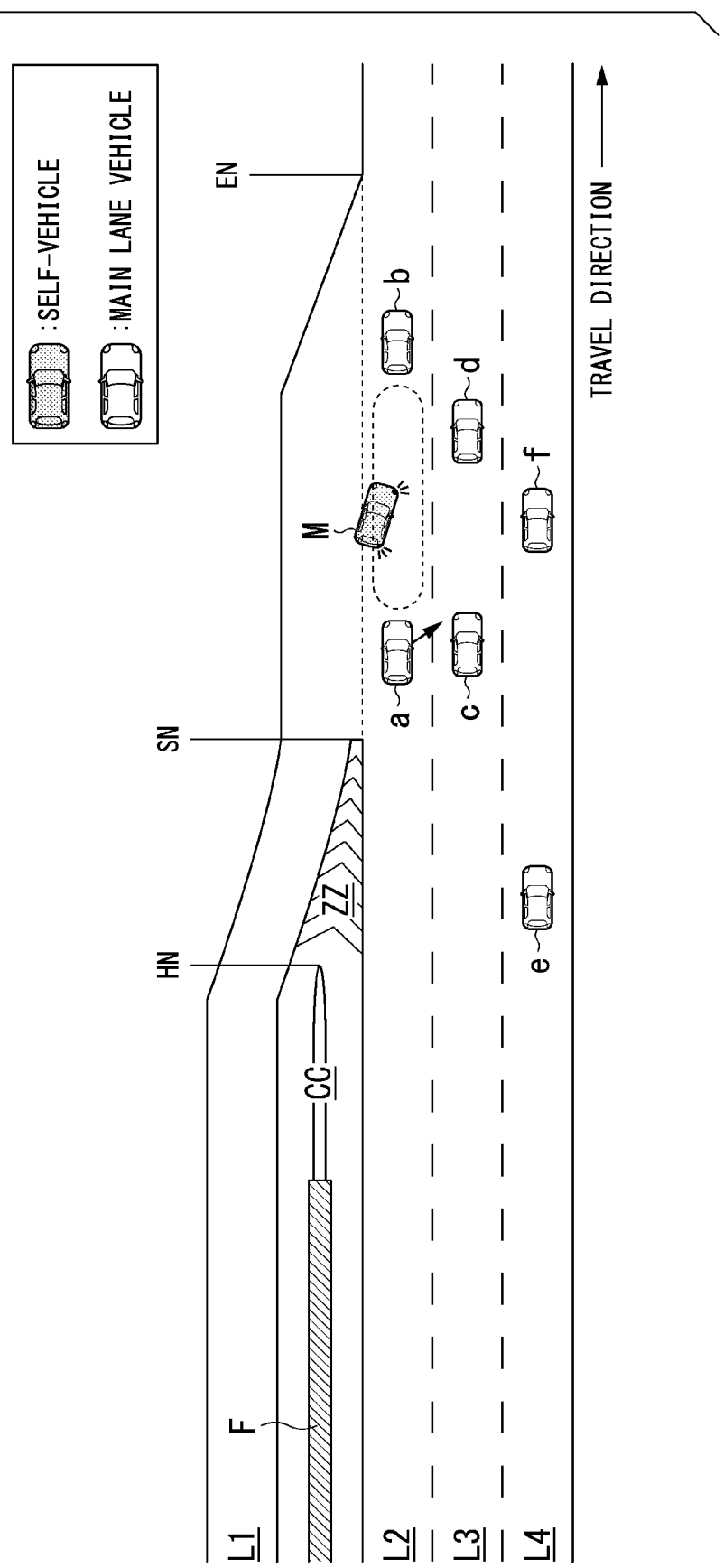
FIG. 13 is a diagram showing an example of a scene in which the self-vehicle M changes its lane to the lane L2.

FIG. 13 is a diagram showing an example of a scene in which the self-vehicle M changes its lane to the lane L2. As shown in FIG. 13, in a case where it is assumed that the self-vehicle M changes its lane to the lane L2, when it is estimated that the self-vehicle M affects the traveling of the main lane vehicle a, the self-vehicle M does not change its lane to the lane L2 as shown in FIG. 13, for example, changes its lane behind the main lane vehicle a.

For example, in a case where it is assumed that the self-vehicle M changes its lane to the lane L2, when it is estimated that the self-vehicle M does not affect the traveling of the main lane vehicle a but the traveling of the main lane vehicle c is affected by the lane change of the main lane vehicle a, the self-vehicle M does not change its lane to the lane L2, for example, changes its lane behind the main lane vehicle a. For example, in a case where it is assumed that the main lane vehicle c performs a lane change, when there is a possibility that the main lane vehicle c will interfere with the main lane vehicle e, it is estimated that the lane change of the self-vehicle M affects the traveling of the main lane vehicles.

[Flowchart]

Figure 14:
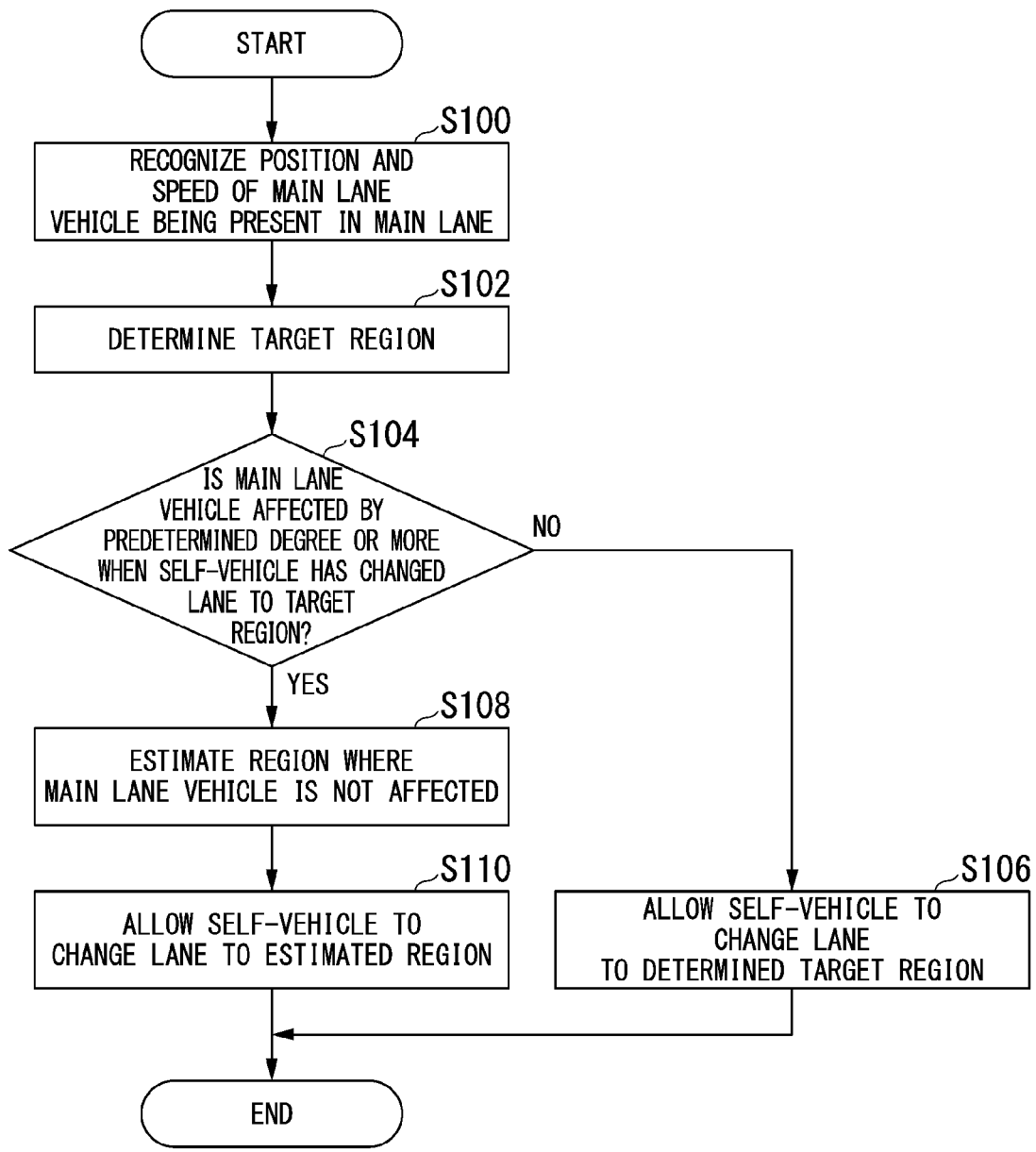
FIG. 14 is a flowchart showing an example of the flow of a process performed by an automated driving control device.

FIG. 14 is a flowchart showing an example of the flow of a process performed by the automated driving control device 100. The present process is, for example, a process performed when the self-vehicle M become able to recognize main lane vehicles and reaches a predetermined distance before the soft nose SN.

First, the recognizer 130 recognizes the position and the speed of a main lane vehicle that is present in a main lane (step S100). Next, on the basis of the recognition result of step S100, the merging controller 142 determines a target region (step S102). The target region is a region (for example, the first region AR1) where the self-vehicle M will perform a lane change. Next, when the self-vehicle M has changed its lane to the target region, the merging controller 142 determines whether the main lane vehicle is affected by a predetermined degree or more (step S104).

When it is determined that the main lane vehicle is not affected by the predetermined degree or more, the merging controller 142 allows the self-vehicle M to change its lane to the determined target region (step S106). When it is determined that the main lane vehicle is affected by the predetermined degree or more, the merging controller 142 determines a target region where the main lane vehicle is estimated not to be affected (step S108). Next, the merging controller 142 allows the self-vehicle M to change its lane to the target region determined in step S108 (step S110). The merging controller 142 generates a second plan different from the first plan, and allows the self-vehicle M to change its lane to the main lane on the basis of the second plan. The second plan is a plan in which the self-vehicle M changes its lane behind the main lane vehicle a, or a plan in which the self-vehicle M is separated from the main lane vehicle a by a predetermined distance or more and excludes main lane vehicle a from a target for which the relative relationship is compared. In this way, the process of one routine of the present flowchart ends.

As in the process described above, the merging controller 142 can determine a region, where a lane change is to be performed, in consideration of an influence on the main lane vehicle when the self-vehicle M performs a lane change, thereby performing more appropriate merging according to traffic conditions.

Figure 15:
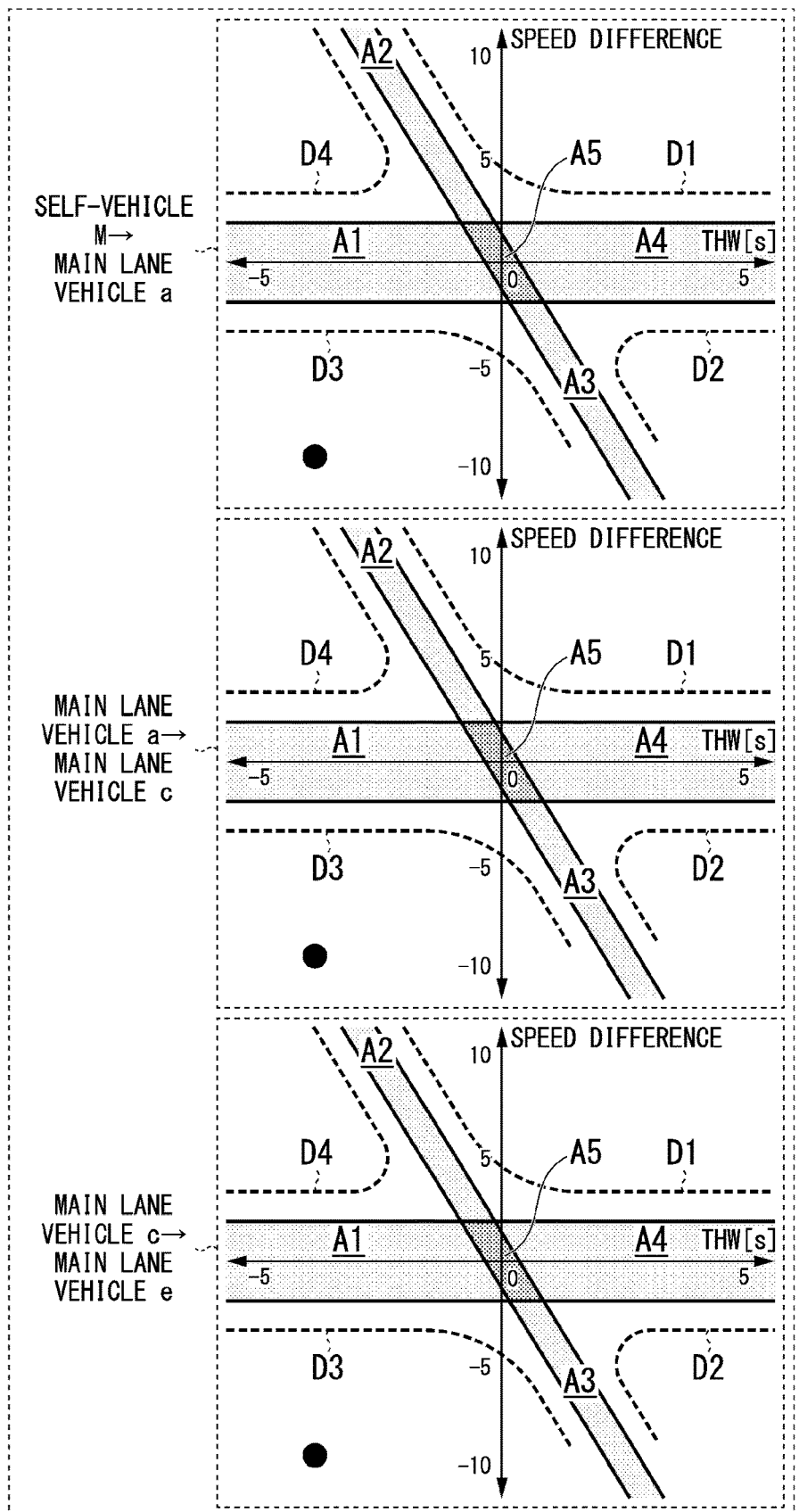
FIG. 15 is a diagram showing an example of the relative relationship between the self-vehicle M and main lane vehicles and a graph.

FIG. 15 is a diagram showing an example of the relative relationship between the self-vehicle M and main lane vehicles and a graph. The relative relationship of FIG. 15 indicates the relative relationship between the self-vehicle M and the main lane vehicles of FIG. 11. The self-vehicle M is present in front of the main lane vehicle a and the speed of the self-vehicle M is faster than the speed of the main lane vehicle a. That is, the self-vehicle M is associated with the third quadrant in the relative relationship with the main lane vehicle a. The main lane vehicle a is present in front of the main lane vehicle c and the speed of the main lane vehicle a is faster than the speed of the main lane vehicle c. That is, the main lane vehicle a is associated with the third quadrant in the relative relationship with the main lane vehicle c. The main lane vehicle c is present in front of the main lane vehicle e and the speed of the main lane vehicle c is faster than the speed of the main lane vehicle e. That is, the main lane vehicle c is associated with the third quadrant in the relative relationship with the main lane vehicle e.

As described above, since the self-vehicle M, the main lane vehicle a, and the main lane vehicle c are associated with the third quadrant and it is estimated that each of the self-vehicle M, the main lane vehicle a, and the main lane vehicle c can change its lane to a region in front of a target vehicle, the self-vehicle M performs a lane change so as to enter in front of the main lane vehicle a. That is, since the lane change of the self-vehicle M does not affect the travelling of the main lane vehicles, the self-vehicle M can perform the lane change.

Figure 16:
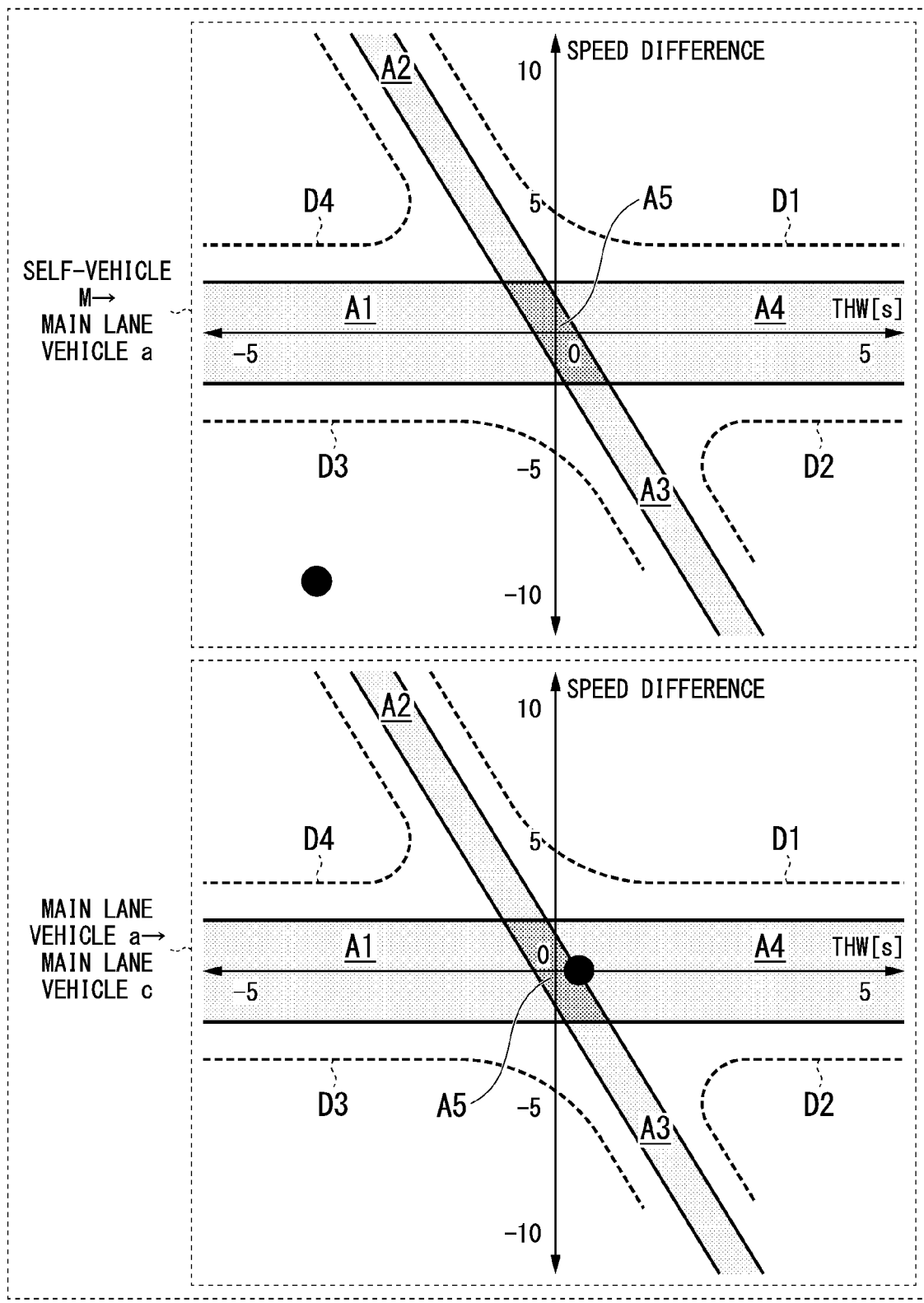
FIG. 16 is a diagram showing an example of the relative relationship between the self-vehicle M and main lane vehicles and a graph.

FIG. 16 is a diagram showing an example of the relative relationship between the self-vehicle M and main lane vehicles and a graph. The relative relationship of FIG. 16 indicates the relative relationship between the self-vehicle M and the main lane vehicles of FIG. 13. The self-vehicle M is present in front of the main lane vehicle a and the speed of the self-vehicle M is faster than the speed of the main lane vehicle a. That is, the self-vehicle M is associated with the third quadrant in the relative relationship with the main lane vehicle a. However, the main lane vehicle a is present at a position where it overlaps with the main lane vehicle c in the width direction thereof, and the speed of the main lane vehicle a and the speed of the main lane vehicle c are substantially the same. That is, the main lane vehicle a is associated with the region A4 in the relative relationship with the main lane vehicle c.

As described above, when the main lane vehicle a performs a lane change due to a lane change of the self-vehicle M, since the main lane vehicle a interferes with the main lane vehicle c, the self-vehicle M performs no lane change so as to enter in front of the main lane vehicle a. In such a case, for example, the self-vehicle M decelerates and is located behind the main lane vehicle (the position and the speed of the self-vehicle M are controlled to be in the first quadrant) and then performs a lane change. As a consequence, it is possible to perform more appropriate merging according to traffic conditions.

Figure 17:
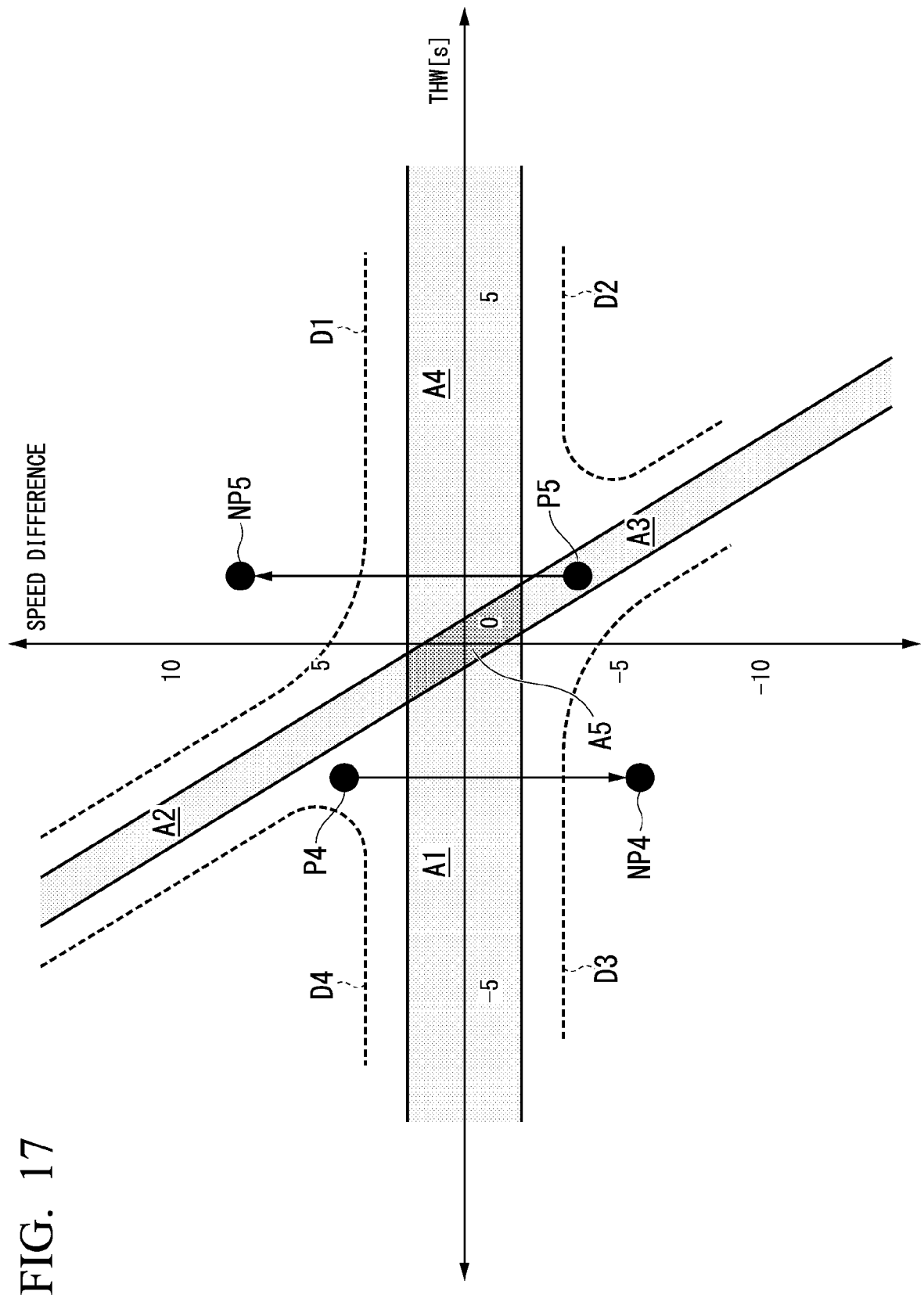
FIG. 17 is a flowchart showing another example of a process performed by the automated driving control device.

FIG. 17 is a flowchart showing another example of a process performed by the automated driving control device 100. For example, as shown in FIG. 17, when the relationship between the speed and the position of the self-vehicle M is included inside the regions A1 to A5 or the region surrounded by the broken lines D1 to D4, the automated driving control device 100 moves the relationship between the speed and the position of the self-vehicle M outside the regions A1 to A5 or outside the region surrounded by the broken lines D1 to D4. Then, on the basis of the degree of influence of the self-vehicle M on the main lane vehicle when the self-vehicle M changes its lane to the main lane in such a state, the automated driving control device 100 may determine whether to change lanes to be in front of or behind the main lane vehicle.

Specifically, when the relationship between the speed and the position of the self-vehicle M is the position P4 in the region surrounded by the broken lines D1 to D4, the automated driving control device 100 assumes a state in state the relationship between the speed and the position of the self-vehicle M is the position NP4 outside the region surrounded by the broken lines D1 to D4. Then, when a lane change of the self-vehicle M does not affect the main lane vehicle in such an assumed state, the automated driving control device 100 may accelerate the self-vehicle M to move the relationship between the speed and the position of the self-vehicle M to the third quadrant, and allow the self-vehicle M to perform a lane change. However, it is a condition that the relationship between the speed and the position of the self-vehicle M can be moved to the third quadrant until the self-vehicle M reaches the soft nose SN (or a specific position in front of the end nose EN).

When the relationship between the speed and the position of the self-vehicle M is the position P5 in the region A3, the automated driving control device 100 assumes a state in state the relationship between the speed and the position of the self-vehicle M is the position NP5 outside the region surrounded by the broken lines D1 to D4. Then, when a lane change of the self-vehicle M does not affect the main lane vehicle in such an assumed state, the automated driving control device 100 may decelerate the self-vehicle M to move the relationship between the speed and the position of the self-vehicle M to the first quadrant, and allow the self-vehicle M to perform a lane change. However, it is a condition that the relationship between the speed and the position of the self-vehicle M can be moved to the first quadrant until the self-vehicle M reaches the soft nose SN (or a specific position in front of the end nose EN).

As described above, when the relationship between the position and the speed of the self-vehicle M is present in the region surrounded by the broken lines D1 to D4, the automated driving control device 100 assumes a case where the relationship between the position and the speed of the self-vehicle M is present outside the region surrounded by the broken lines D1 to D4, and determines whether the self-vehicle M can its lane to the main lane without affecting the main lane vehicle. When the self-vehicle M can change its lane to the main lane without affecting the main lane vehicle, the automated driving control device 100 allows the self-vehicle M to change its lane to the main lane. As a consequence, the self-vehicle M can perform a lane change more smoothly.

In accordance with the embodiment of the modification described above, when it is assumed that the self-vehicle has changed its lane to the first main lane on the basis of the first plan, the automated driving control device 100 allows the self-vehicle M to change its lane to the first main lane on the basis of the degree of interference when the main lane vehicle has performed a lane change, so that it is possible to perform more appropriate merging according to traffic conditions.

[Hardware Configuration]

Figure 18:
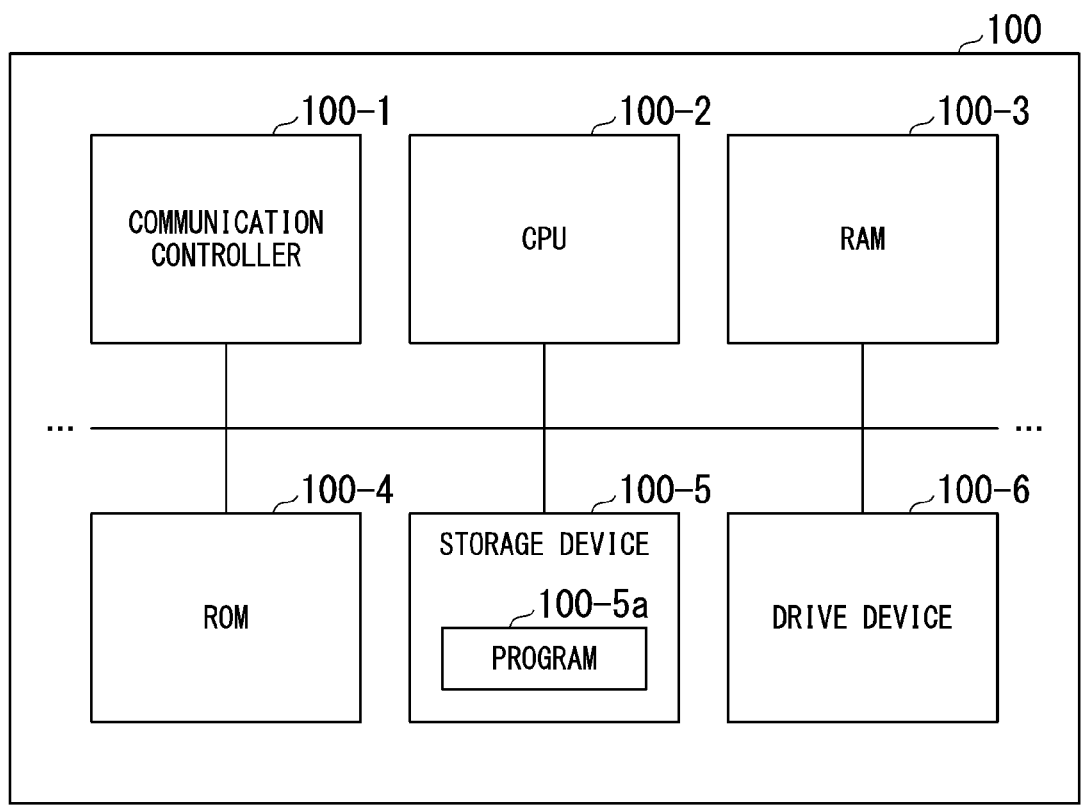
FIG. 18 is a diagram showing an example of a hardware configuration of the automated driving control device of an embodiment.

FIG. 18 is a diagram showing an example of a hardware configuration of the automated driving control device 100 of an embodiment. As shown in FIG. 18, the automated driving control device 100 has a configuration in which a communication controller 100-1, a CPU 100-2, a random access memory (RAM) 100-3 used as a working memory, a read only memory (ROM) 100-4 for storing a boot program and the like, a storage device 100-5 such as a flash memory and a hard disk drive (HDD), a drive device 100-6, and the like are connected to one another by an internal bus or a dedicated communication line. The communication controller 100-1 communicates with components other than the automated driving control device 100. The storage device 100-5 stores a program 100-5a that is executed by the CPU 100-2. The program is developed to the RAM 100-3 by a direct memory access (DMA) controller (not shown) and the like, and is executed by the CPU 100-2. In this way, some or all of the first controller 120, the second controller 160, and functional units included therein are implemented.

The aforementioned embodiment can be represented as follows.

A vehicle control device includes a storage device that stores a program and a hardware processor, and the hardware processor executes the program stored in the storage device, so that the vehicle control device is configured to perform a process of recognizing a position and a speed of a vehicle traveling in a lane included in a main lane, the main lane being a merging destination of a merging path, when a self-vehicle is traveling in the merging path; and a process of generating a first plan for changing a lane of the self-vehicle to in front of or behind a first vehicle traveling in a first main lane closest to the merging path of the main lane, based on a relative relationship between a position and a speed of the self-vehicle and a position and a speed of the first vehicle; and a process of allowing the self-vehicle to change lanes to the first main lane based on the first plan when it is estimated that a third vehicle is able to change lanes to a second main lane adjacent to the first main lane without interfering with a fourth vehicle, based on a relative relationship between a position and a speed of the third vehicle and a position and a speed of the fourth vehicle in a case where it is assumed that the self-vehicle has changed lanes to the first main lane based on the first plan, the third vehicle being the first vehicle or a second vehicle present behind the self-vehicle and traveling in the first main lane, the fourth vehicle traveling in the vicinity of the third vehicle in the second main lane.

Although a mode for carrying out the present invention has been described using the embodiments, the present invention is not limited to these embodiments and various modifications and substitutions can be made without departing from the spirit of the present invention.

What is claimed is:

1. A vehicle control device comprising:
   a recognizer configured to recognize a position and a speed of a vehicle traveling in a lane included in a main lane, the main lane being a merging destination of a merging path, when a self-vehicle is traveling in the merging path; and
   a merging controller configured to generate a first plan for changing a lane of the self-vehicle to in front of or behind a first vehicle traveling in a first main lane closest to the merging path of the main lane, based on a relative relationship between a position and a speed of the self-vehicle and a position and a speed of the first vehicle, and
   to allow the self-vehicle to change lanes to the first main lane based on the first plan when it is estimated that a third vehicle is able to change lanes to a second main lane adjacent to the first main lane without interfering with a fourth vehicle, based on a relative relationship between a position and a speed of the third vehicle and a position and a speed of the fourth vehicle in a case where it is assumed that the self-vehicle has changed lanes to the first main lane based on the first plan, the third vehicle being the first vehicle or a second vehicle present behind the self-vehicle and traveling in the first main lane, the fourth vehicle traveling in the vicinity of the third vehicle in the second main lane,
   wherein, in a case where it is estimated that the third vehicle is able to change lanes to the second main lane without interfering with the fourth vehicle, when it is estimated that the fourth vehicle is able to change lanes to a third main lane without interfering with a fifth vehicle based on a relative relationship between the position and the speed of the fourth vehicle and a position and a speed of the fifth vehicle, the merging controller is configured to allow the self-vehicle to change lanes to the first main lane based on the first plan, the fifth vehicle traveling around the fourth vehicle in the third main lane adjacent to the second main lane.

2. The vehicle control device according to claim 1, wherein, when it is estimated that the third vehicle interferes with the fourth vehicle when changing the lane to the second main lane, the merging controller is configured to allow the self-vehicle to change lanes to the first main lane based on a second plan different from the first plan.

3. The vehicle control device according to claim 1, wherein the merging controller is configured to generate the first plan for changing the lane of the self-vehicle to in front of or behind the first vehicle in the first main lane based on the relative relationship between the position and the speed of the self-vehicle and the position and the speed of the first vehicle and determination information associated with a criterion that two vehicles will interfere with each other based on a relative relationship between the two vehicles, and
   is configured to determine whether the third vehicle is able to change lanes to the second main lane without interfering with the fourth vehicle, based on the relative relationship between the position and the speed of the third vehicle and the position and the speed of the fourth vehicle, and the determination information.

4. The vehicle control device according to claim 1, wherein, when it is estimated that the fourth vehicle interferes with the fifth vehicle when changing the lane to the third main lane, the merging controller is configured to allow the self-vehicle to change lanes to the first main lane based on a second plan different from the first plan.

5. The vehicle control device according to claim 1, wherein, based on a relative relationship between a pair of two vehicles and determination information associated with a criterion that the two vehicles will interfere with each other, the merging controller is configured to determine whether the self-vehicle is able to change lanes to the first main lane, the third vehicle is able to change lanes to the second main lane, and the fourth vehicle is able to change lanes to the third main lane.

6. A vehicle control method implemented by a computer performing:
   a process of recognizing a position and a speed of a vehicle traveling in a lane included in a main lane, the main lane being a merging destination of a merging path, when a self-vehicle is traveling in the merging path; and
   a process of generating a first plan for changing a lane of the self-vehicle to in front of or behind a first vehicle traveling in a first main lane closest to the merging path of the main lane, based on a relative relationship between a position and a speed of the self-vehicle and a position and a speed of the first vehicle; and
   a process of allowing the self-vehicle to change lanes to the first main lane based on the first plan when it is estimated that a third vehicle is able to change lanes to a second main lane adjacent to the first main lane without interfering with a fourth vehicle, based on a relative relationship between a position and a speed of the third vehicle and a position and a speed of the fourth vehicle in a case where it is assumed that the self-vehicle has changed lanes to the first main lane based on the first plan, the third vehicle being the first vehicle or a second vehicle present behind the self-vehicle and traveling in the first main lane, the fourth vehicle traveling in the vicinity of the third vehicle in the second main lane,
   wherein, in a case where it is estimated that the third vehicle is able to change lanes to the second main lane without interfering with the fourth vehicle, when it is estimated that the fourth vehicle is able to change lanes to a third main lane without interfering with a fifth vehicle based on a relative relationship between the position and the speed of the fourth vehicle and a position and a speed of the fifth vehicle, a process of allowing the self-vehicle to change lanes to the first main lane based on the first plan, the fifth vehicle traveling around the fourth vehicle in the third main lane adjacent to the second main lane.

7. A non-transitory computer readable storing medium storing a program causing a computer to perform:
   a process of recognizing a position and a speed of a vehicle traveling in a lane included in a main lane, which is a merging destination of a merging path, when a self-vehicle is traveling in the merging path; and
   a process of generating a first plan for changing a lane of the self-vehicle to in front of or behind a first vehicle, which travels in a first main lane closest to the merging path of the main lane, based on a relative relationship between a position and a speed of the self-vehicle and a position and a speed of the first vehicle; and a process of allowing the self-vehicle to change lanes to the first main lane based on the first plan when it is estimated that a third vehicle is able to change lanes to a second main lane adjacent to the first main lane without interfering with a fourth vehicle, based on a relative relationship between a position and a speed of the third vehicle and a position and a speed of the fourth vehicle in a case where it is assumed that the self-vehicle has changed lanes to the first main lane based on the first plan, the third vehicle being the first vehicle or a second vehicle present behind the self-vehicle and traveling in the first main lane, the fourth vehicle traveling in the vicinity of the third vehicle in the second main lane wherein, in a case where it is estimated that the third vehicle is able to change lanes to the second main lane without interfering with the fourth vehicle, when it is estimated that the fourth vehicle is able to change lanes to a third main lane without interfering with a fifth vehicle based on a relative relationship between the position and the speed of the fourth vehicle and a position and a speed of the fifth vehicle, a process of allowing the self-vehicle to change lanes to the first main lane based on the first plan, the fifth vehicle traveling around the fourth vehicle in the third main lane adjacent to the second main lane.

\* \* \* \* \*